(12) United States Patent
Krestyannikov

(10) Patent No.: US 9,532,041 B2
(45) Date of Patent: Dec. 27, 2016

(54) METHOD AND SYSTEM FOR AUTOMATIC FOCUS WITH SELF-CALIBRATION

(71) Applicant: Intel Corporation, Santa Clara, CA (US)

(72) Inventor: Evgeny Krestyannikov, Tampere (FI)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 14/329,465

(22) Filed: Jul. 11, 2014

(65) Prior Publication Data

US 2016/0014404 A1  Jan. 14, 2016

(51) Int. Cl.
*H04N 17/00* (2006.01)
*G03B 13/36* (2006.01)
*G06T 7/00* (2006.01)
*H04N 5/232* (2006.01)
*G02B 7/38* (2006.01)

(52) U.S. Cl.
CPC .............. *H04N 17/002* (2013.01); *G02B 7/38* (2013.01); *G03B 13/36* (2013.01); *G06T 7/0018* (2013.01); *H04N 5/23212* (2013.01)

(58) Field of Classification Search
CPC ................................................... H04N 5/23212
USPC .................................. 348/187, 348; 396/125
See application file for complete search history.

(56) References Cited

U.S. PATENT DOCUMENTS

2008/0158408 A1* 7/2008 Asano .................... G03B 13/36
348/348
2009/0202235 A1* 8/2009 Li ...................... H04N 5/23212
396/125

\* cited by examiner

*Primary Examiner* — Joel Fosselman
(74) *Attorney, Agent, or Firm* — Green, Howard & Mughal, LLP

(57) ABSTRACT

A systems, article, and method to provide automatic focus with self-calibration.

23 Claims, 13 Drawing Sheets

500

OBTAIN LENS POSITION CALIBRATION DATA USED TO CAPTURE A PLURALITY OF FRAMES OF A VIDEO SEQUENCE OR STILL PHOTOGRAPHS
502

↓

CALCULATE AT LEAST ONE OF: AN UPDATED START OF CONTROLLABILITY (SOC), AN UPDATED END OF CONTROLLABILITY (EOC), UPDATED INFINITY POSITION (INF), AND DEPENDING, AT LEAST IN PART, ON THE LENS POSITION CALIBRATION DATA OF THE PLURALITY OF FRAMES OR STILL PHOTOGRAPHS
504

↓

USE AT LEAST ONE OF THE UPDATED SOC, EOC, AND INF TO UPDATE A RANGE OF POSSIBLE LENS POSITIONS TO CAPTURE A FRAME OR PHOTOGRAPH
506

OBTAIN LENS POSITION CALIBRATION DATA USED TO CAPTURE A PLURALITY OF FRAMES OF A VIDEO SEQUENCE OR STILL PHOTOGRAPHS
502

CALCULATE AT LEAST ONE OF: AN UPDATED START OF CONTROLLABILITY (SOC), AN UPDATED END OF CONTROLLABILITY (EOC), UPDATED INFINITY POSITION (INF), AND DEPENDING, AT LEAST IN PART, ON THE LENS POSITION CALIBRATION DATA OF THE PLURALITY OF FRAMES OR STILL PHOTOGRAPHS
504

USE AT LEAST ONE OF THE UPDATED SOC, EOC, AND INF TO UPDATE A RANGE OF POSSIBLE LENS POSITIONS TO CAPTURE A FRAME OR PHOTOGRAPH
506

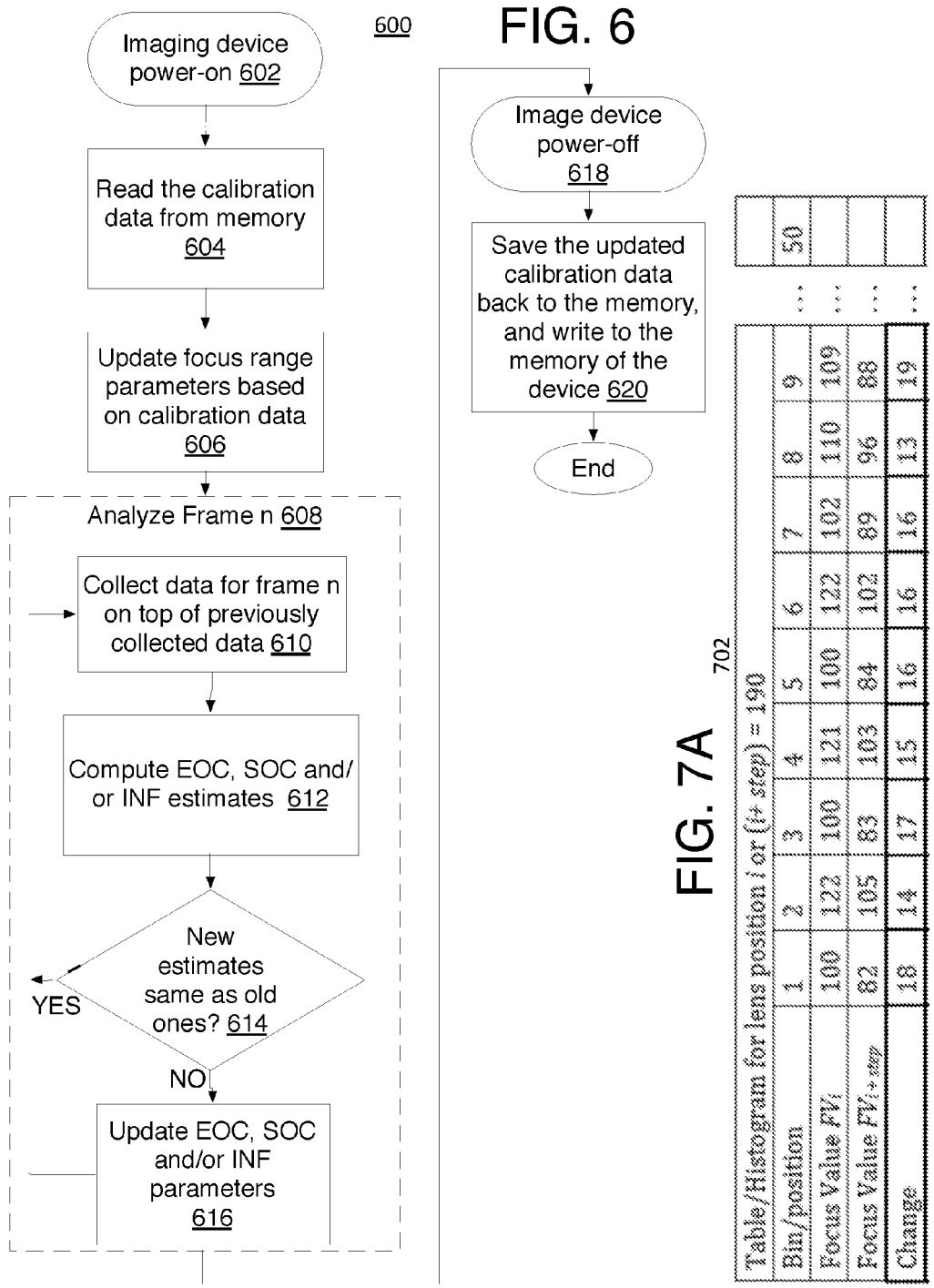

FIG. 7

| Mean | 0 | 0 | 0 | 0 | 0 | 0 | 0 | 0 | 0 | 0 | 0 | 0 | 0 | 5 | 0 | 0 | 0 | 0 | 0 | 0 | 0 | 0 | 0 | 0 | 0 | 0 | 0 | 0 | 0 | 7 | 0 | 0 | 0 | 0 | 14 | 0 | 0 | 0 |
|---|---|---|---|---|---|---|---|---|---|---|---|---|---|---|---|---|---|---|---|---|---|---|---|---|---|---|---|---|---|---|---|---|---|---|---|---|---|---|
| LensPos | 76 | 77 | 78 | 79 | 80 | 81 | 82 | 83 | 84 | 85 | 86 | 87 | 88 | 89 | 90 | 91 | 92 | 93 | 94 | 95 | 96 | 97 | 98 | 99 | 100 | 101 | 102 | 103 | 104 | 105 | 106 | 107 | 108 | 109 | 110 | 111 | 112 | 113 |
| Count | 0 | 0 | 0 | 0 | 0 | 0 | 0 | 0 | 0 | 0 | 0 | 0 | 0 | 2 | 0 | 0 | 0 | 0 | 0 | 0 | 0 | 0 | 0 | 0 | 0 | 0 | 0 | 0 | 0 | 1 | 0 | 0 | 0 | 0 | 2 | 0 | 0 | 0 |
| FLP | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| Mean | 10 | 9 | 0 | 7 | 7 | 0 | 0 | 10 | 27 | 0 | 0 | 0 | 0 | 0 | 0 | 2 | 0 | 0 | 0 | 3 | 18 | 2 | 7 | 0 | 0 | 2 | 0 | 3 | 5 | 5 | 0 | 7 | 4 | 0 | 2 | 3 | 2 | 4 | 0 | 5 | 23 |
|---|---|---|---|---|---|---|---|---|---|---|---|---|---|---|---|---|---|---|---|---|---|---|---|---|---|---|---|---|---|---|---|---|---|---|---|---|---|---|---|---|---|
| LensPos | 114 | 115 | 116 | 117 | 118 | 119 | 120 | 121 | 122 | 123 | 124 | 125 | 126 | 127 | 128 | 129 | 130 | 131 | 132 | 133 | 134 | 135 | 136 | 137 | 138 | 139 | 140 | 141 | 142 | 143 | 144 | 145 | 146 | 147 | 148 | 149 | 150 | 151 |
| Count | 0 | 1 | 0 | 2 | 1 | 0 | 0 | 1 | 2 | 0 | 0 | 0 | 0 | 0 | 0 | 1 | 0 | 0 | 0 | 2 | 1 | 1 | 2 | 0 | 0 | 2 | 0 | 2 | 3 | 4 | 0 | 4 | 3 | 2 | 1 | 1 | 2 | 1 | 0 | 4 | 4 |
| FLP | 0 | 0 | 0 | 0 | 0 | 0 | 0 | 0 | 0 | 0 | 0 | 0 | 0 | 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| Mean | 6 | 7 | 0 | 18 | 6 | 6 | 1 | 5 | 6 | 3 | 9 | 2 | 4 | 6 | 7 | 6 | 5 | 8 | 7 | 8 | 9 | 6 | 9 | 17 | 11 | 10 | 10 | 9 | 12 | 9 | 12 | 14 | 11 | 12 | 12 | 9 |
|---|---|---|---|---|---|---|---|---|---|---|---|---|---|---|---|---|---|---|---|---|---|---|---|---|---|---|---|---|---|---|---|---|---|---|---|---|
| LensPos | 152 | 153 | 154 | 155 | 156 | 157 | 158 | 159 | 160 | 161 | 162 | 163 | 164 | 165 | 166 | 167 | 168 | 169 | 170 | 171 | 172 | 173 | 174 | 175 | 176 | 177 | 178 | 179 | 180 | 181 | 182 | 183 | 184 | 185 | 186 | 187 | 188 | 189 |
| Count | 2 | 2 | 0 | 7 | 5 | 3 | 1 | 5 | 4 | 5 | 4 | 4 | 3 | 2 | 7 | 6 | 8 | 6 | 15 | 10 | 4 | 5 | 9 | 8 | 6 | 11 | 9 | 7 | 9 | 14 | 14 | 17 |
| FLP | 0 | 0 | 0 | 0 | 0 | 0 | 0 | 0 | 1 | 0 | 1 | 0 | 1 | 2 | 0 | 2 | 2 | 1 | 5 | 2 | 2 | 1 | 4 | 1 | 2 | 1 | 2 | 4 | 8 | 2 | 4 | 5 | 6 | 14 | 9 | 6 | 7 |

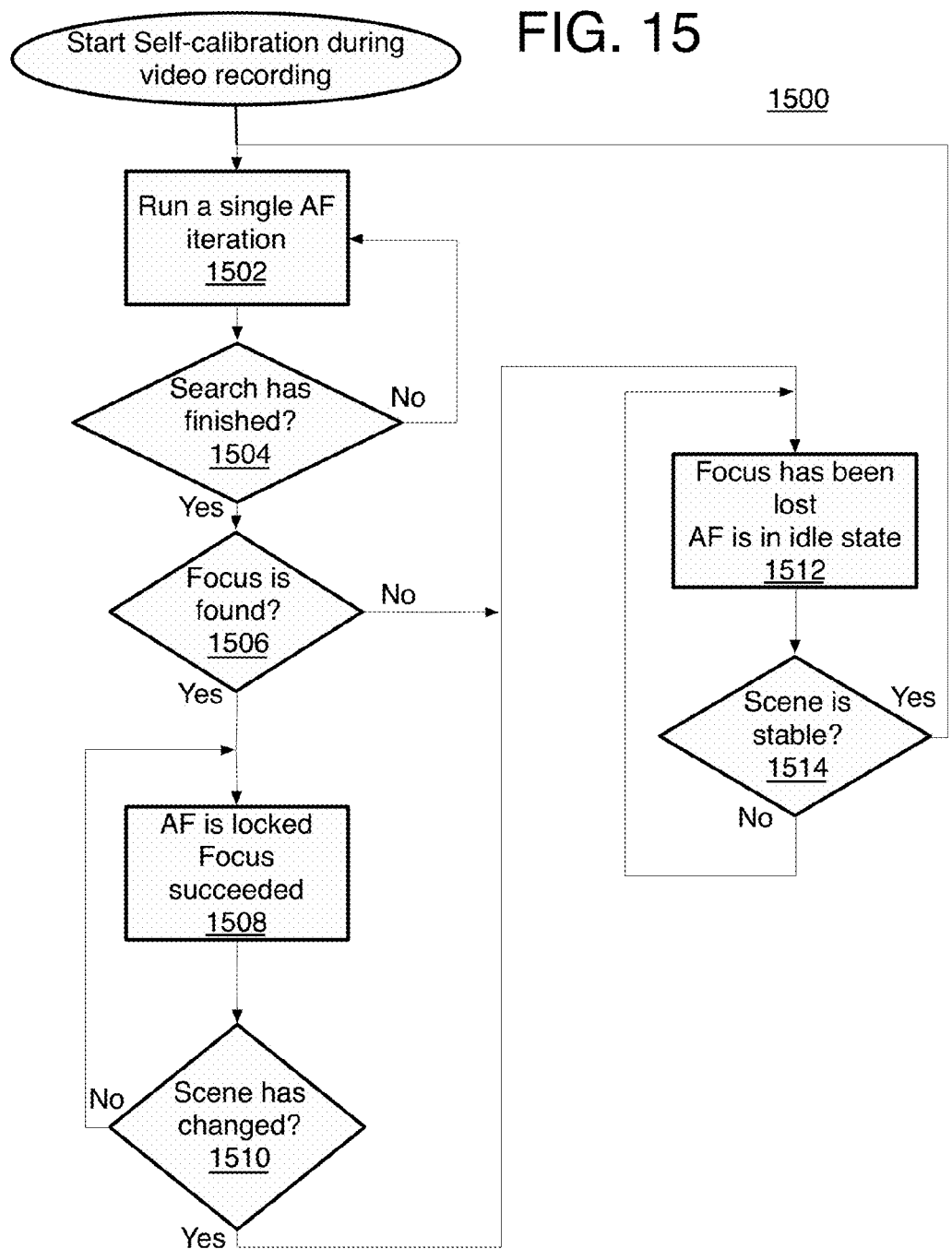

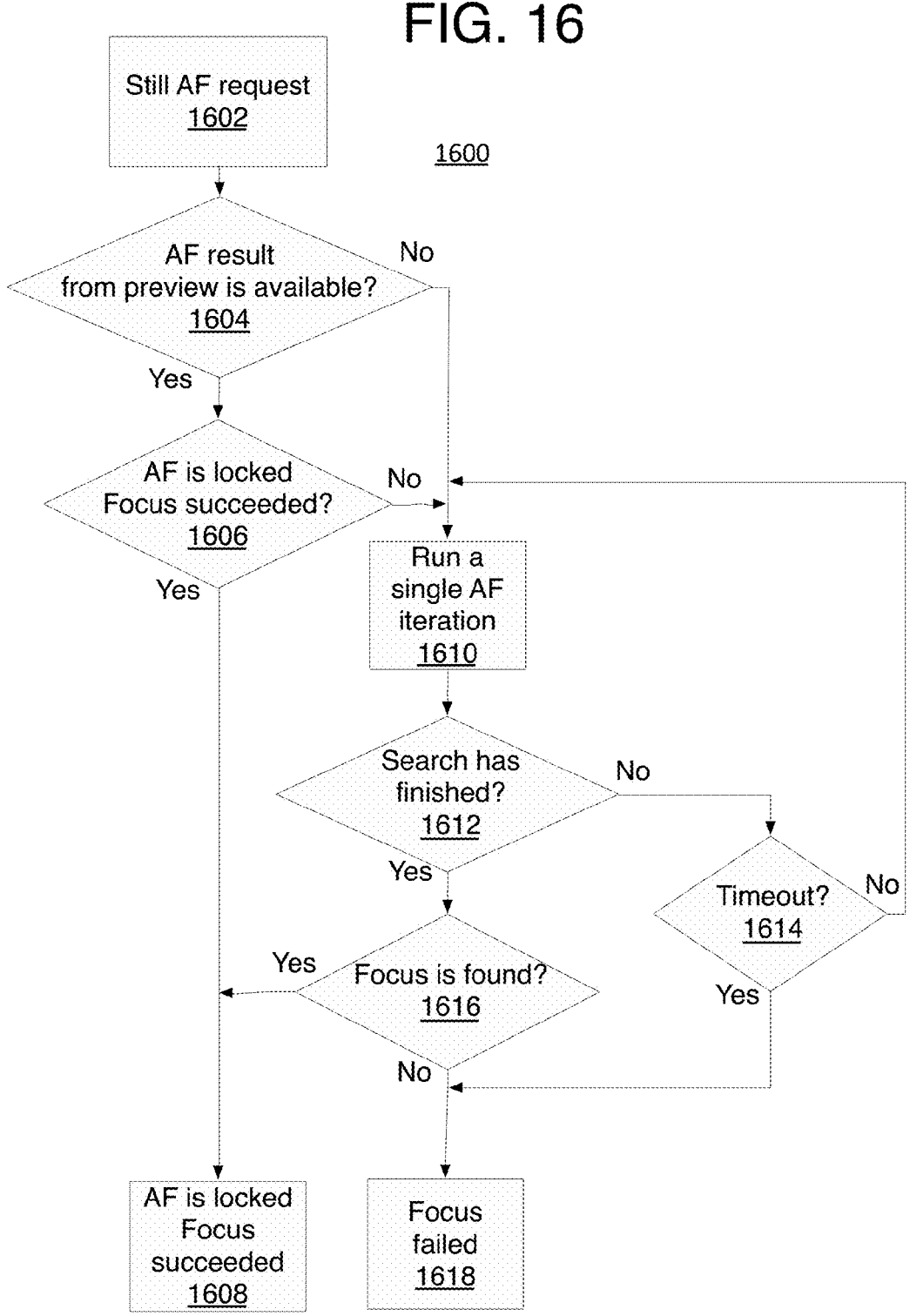

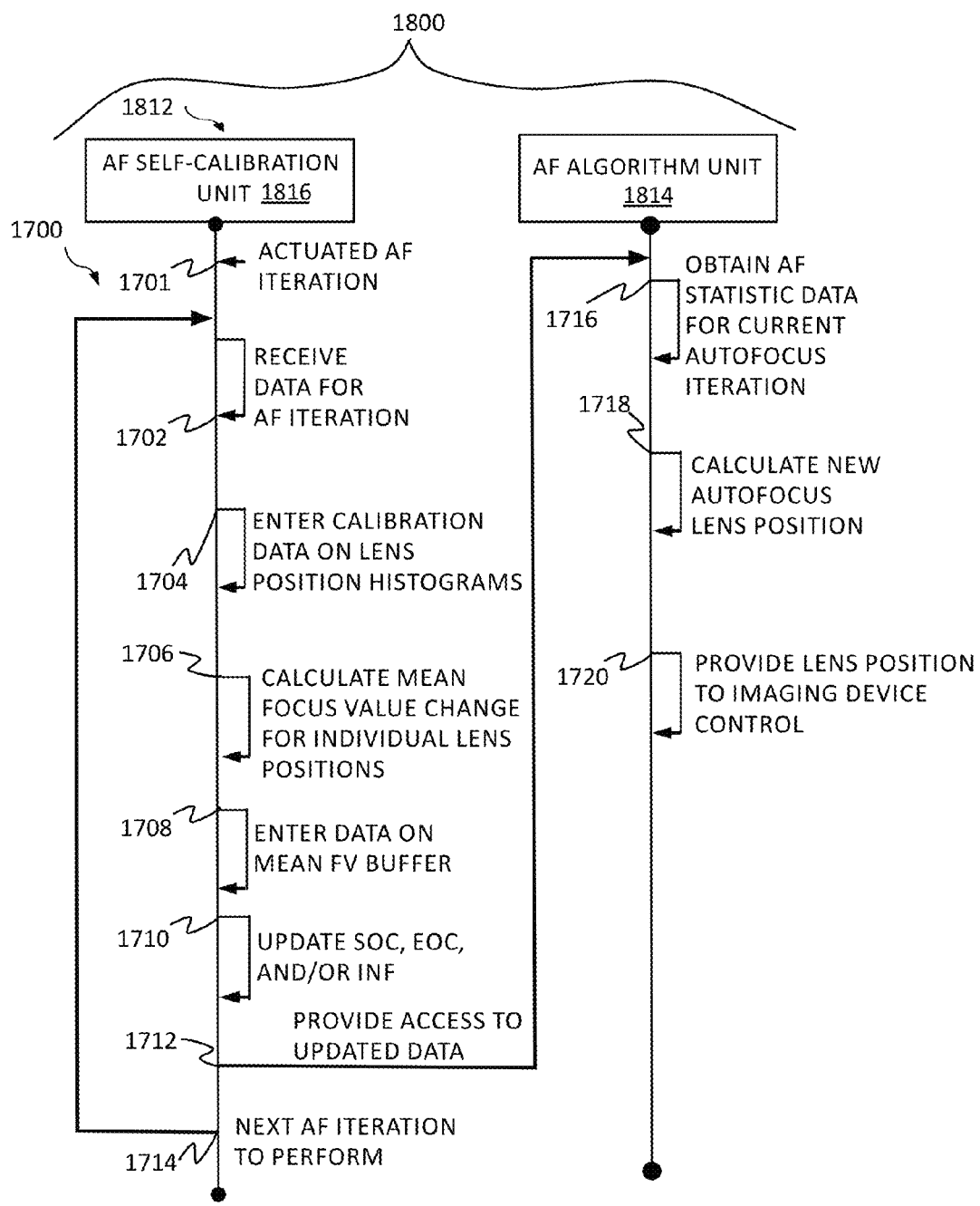

METHOD AND SYSTEM FOR AUTOMATIC FOCUS WITH SELF-CALIBRATION

BACKGROUND

Digital image processing devices, such as digital cameras, use automatic features to increase the quality of an image, such as the preview screen on the digital camera as well as the recorded image and recorded video. This includes the 3A features which refers to automatic white balancing (AWB), automatic focus (AF), and automatic exposure control (AEC). Automatic focus is the automatic adjustment of the lens position relative to an image sensor or other image capture medium to obtain a sharp, clear image.

The movement of the lens is controlled by a camera actuator or motor that converts electric current, in case of a voice coil motor (VCM) actuator, into motion. The position of the lens is linearly proportional to the electric current (in mA) applied. In order to perform calculations to place the lens at a specific position, it must be determined what current should be applied to move the lens to that position. Due to manufacturing tolerances and/or other errors that can occur during manufacturing of the camera devices and the devices that hold the cameras when part of a smart phone for example, the amount of current to move the lens to the same desired location may differ from device to device. Thus, algorithms to calibrate each device individually were developed. This included applying sufficient current to place the lens at a first position close to a near mechanical end in the camera and then at a second position close to a far mechanical end within the camera where the distances from the far and near mechanical ends were known. The electrical current to obtain other important positions along the range of motion of the lens then could be interpolated from these two positions.

Thus, the conventional calibration procedure is tedious, labor-intensive, and time consuming, which increases the cost of each camera device. When low-cost device manufacturers are generally not willing to do the factory calibration for their camera devices, the absence of the calibration data may severely compromise the autofocus performance and negatively affect the focusing speed and accuracy as the AF may need to scan through the whole range of VCM values to find the best in-focus position.

On the other hand, even if the calibration is performed, it does not guarantee that all the devices will contain correct calibration information. The results heavily depend on the autofocus calibration algorithm and calibration setup. The calibration may result in erroneous parameters that may misdirect the autofocus algorithm to move the lens to undesirable positions which may cause worse results than without calibration at all, or may even cause a complete failure of the functionality of the autofocus.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 is a flow chart showing a self-calibration process for autofocus on an image capture device;

FIG. 6 is another flow chart showing a self-calibration process for autofocus on an image capture device;

FIG. 7A is a table of a focus value histogram;

FIGS. 7-12 are tables showing self-calibration buffers for the self-calibration processes described herein;

FIG. 15 is a flow chart showing a self-calibration process for autofocus on an image capture device capturing a video sequence;

FIG. 16 is a flow chart showing a self-calibration process for autofocus on an image capture device capturing still pictures;

FIG. 17 is an illustrative diagram of an example system in operation for providing a self-calibration process for autofocus;

DETAILED DESCRIPTION

Figure 1:
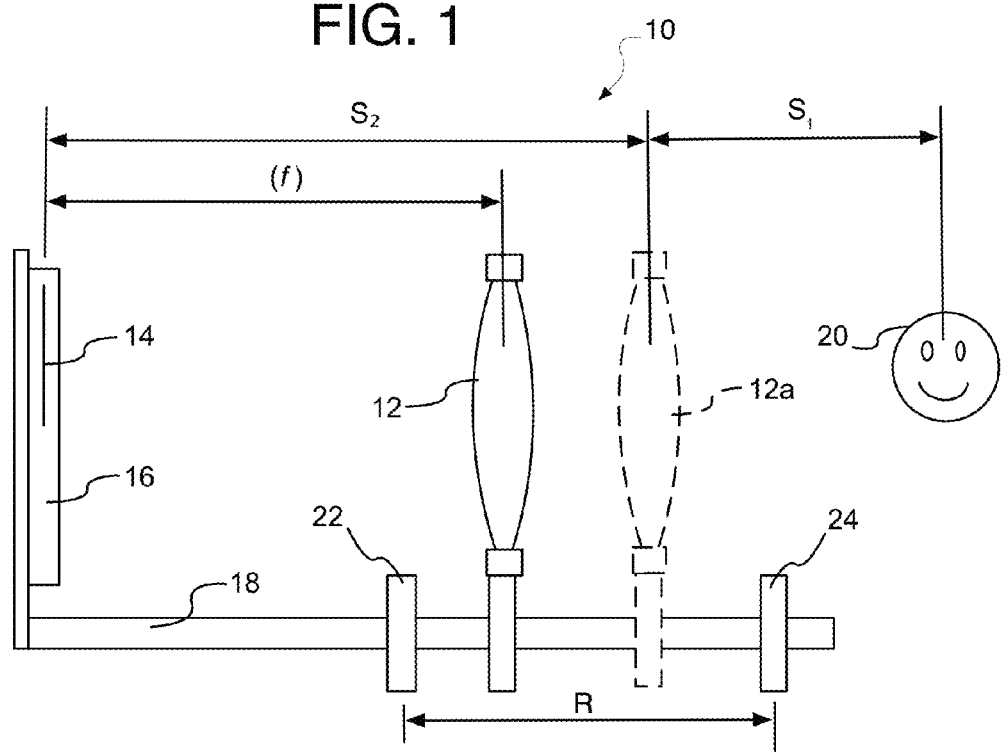
FIG. 1 is a schematic diagram showing the position of a lens on an image capture device.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, Articles, and Methods to Provide Automatic Focus with Self-Calibration.

As mentioned above, many digital cameras and devices with such cameras provide automatic control features such as the 3A features including automatic focus (AF), automatic exposure control (AEC), and automatic white balance (AWB). Relevant herein, automatic focus (AF) uses calibration algorithms to determine the position of the lens at certain electrical current levels so that the lens can be driven to desired positions by applying a corresponding electrical current. It is noted that herein, the terms calibration and self-calibration are used interchangeably depending on the context.

Referring to FIG. 1, an image capture (or imaging) device 10 is provided such as a camera including a mobile camera such as a dedicated digital camera, camera mounted on a smart phone, or many other types of cameras. The image capture device 10 can be considered an optical system which has a lens 12 and an imaging plane 14 formed by a sensor 16. The lens 12 is mounted on a lens actuator 18 near the sensor 16. The lens 12 captures the light from an object of interest 20 and brings it to focus on the sensor 16. The distance from the imaging plane 14 to the lens 12 when the object is focused to "infinity" is called the focal length or distance (I), and is conventionally specified in millimeters. To capture an object positioned closer to the lens 12, the lens 12 is moved farther away from the sensor 16, and the relationship among the distances can be determined by the following equation:

$$\frac{1}{S_1} + \frac{1}{S_2} = \frac{1}{f} \quad (1)$$

where $S_1$ and $S_2$ are the distances from the object 20 to the lens, and from the lens to the sensor, respectively. Thus, the focal distance (f) sets the ratio between distances $S_1$ and $S_2$, and sets the ideal distance between the lens and the imaging plane 14. When the object is closer to the camera than infinity, the lens is moved farther away from the sensor than the infinity lens position and toward the front of the imaging device, toward the object 20. In the present example, the lens 12 may be placed at a position 12a where the distance ($S_1$) from the object 20 to the lens 12 may be 10 cm by one random example. The focal distance (f) also determines the height of the device 10 since the height of the image at the sensor 16 is proportional to the height of the actual object and at the ratio set by the focal distance. Thus, the longer the focal length, the greater the height to fit the entire image at the sensor plane 14. By one form, the imaging device 10 may have a focal length (f) ranging from 3 to 5 mm, while the working range (full optical range) R of the lens varies from 0.2 to 0.5 mm between a far mechanical stop 22 and a near mechanical stop 24 where near and far refer to the distance from the lens to the object. The actuator 18 may have a motor for controlling the lens movement, which converts the energy into motion. For example, a voice coil motor (VCM) converts electricity into motion. Other types of motors that could be used include a piezo motor or stepper motor.

Figure 2:
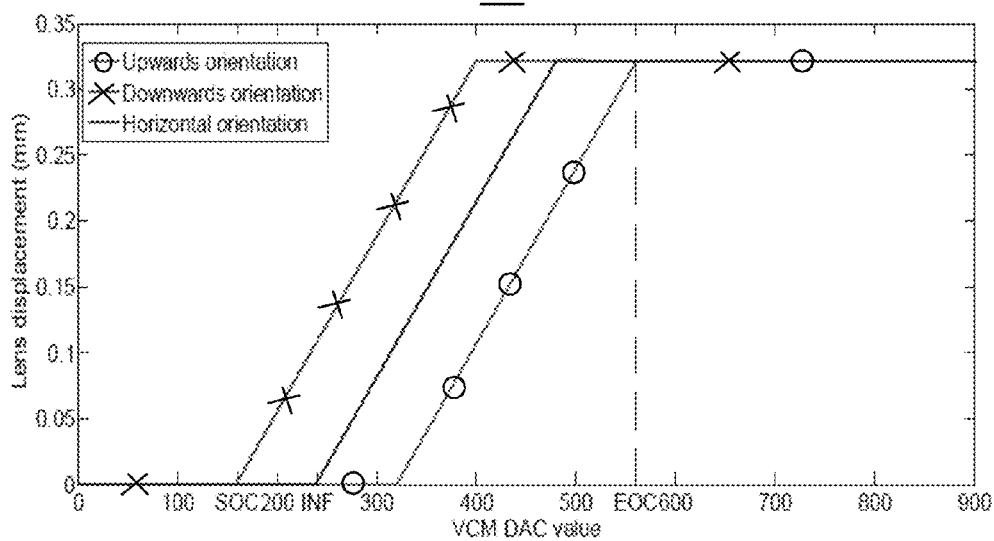
FIG. 2 is a chart showing the relationship between lens displacement and current applied to the lens motor.

Referring to FIG. 2, by one form, the relationship between the lens displacement and electrical drive current needed to move the lens is linear, and one example of this relationship is shown on graph 200. The graph 200 shows lens displacement in mm along the vertical axis and VCM digital-to-analog convertor (DAC) values along the horizontal axis of the graph. The VCM DAC code values (or referred to herein as VCM DAC values or simply VCM values) are linearly proportional to the electric current (in mA) applied. Such a fixed DAC to mA mapping may be provided in the form of look-up tables for example provided by the image device manufacturer. The larger the VCM value, the greater is the resulting displacement of the lens. Different curves in the figure reflect different image device orientations, such that relatively larger current is required to move the lens when the image device, or particularly the lens, is pointed upward compared to the situation when the image device is pointed downward, and the horizontal (or upright) position of the image device falls in between the two extremes. Thus, when the camera is pointed downward, the lens will start to move at about 150 VCM DAC, while at about 250 when upright, and 325 when pointed upward in the illustrated example. This occurs due to gravity which stretches or contracts the spring holding the lens depending on the camera module orientation.

The motion of the lens starts at VCM code values called start of controllability (SOC) which corresponds to the FAR (infinity) mechanical stop. Lens movement stops at the end of controllability (EOC) position corresponding to the NEAR (macro) end. The knowledge of the location of the SOC, EOC, and infinity (INF) positions are important for accurate, robust and fast autofocus functionality. Mechanical variations on the production line may cause significant device-to-device deviations for these values. Thus, as mentioned above, autofocus calibration is conventionally performed for a majority of cameras at the production line.

Also as mentioned, the relationship between the lens displacement and the driving current on the voice coil lens actuators are almost linear such that any change in the actuator input value produces the corresponding linear change in the output. Thus, for the conventional calibration it was sufficient to perform calibration for two positions: a first position closer to the FAR mechanical stop 22, and a second position closer to the NEAR mechanical stop 24. All the other required positions (SOC, EOC, infinity position, 1 meter, 50 cm, 10 cm, etc.) can be easily calculated by using linear interpolation/extrapolation in image device software, once the calibrated values, focal length and posture offset are known.

Figure 3:
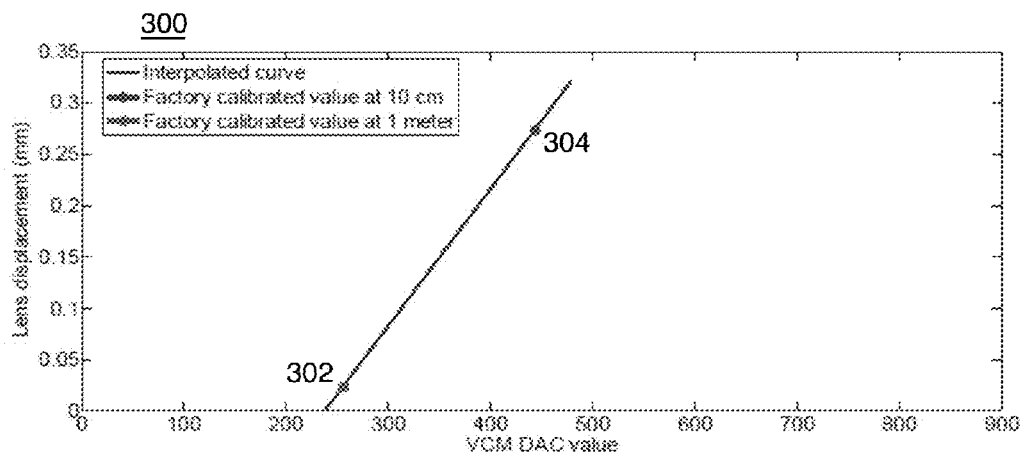
FIG. 3 is a chart showing production line calibration values.

Referring to FIG. 3, a graph 300 shows such a two-point device-based calibration with lens displacement and VCM DAC values shown as with graph 200, except here the calibration using the two first and second positions 302 and 304 are shown. One-time autofocus calibration is conventionally performed on a factory production line (either camera supplier's line or device manufacturing line) by running the autofocus algorithm for arbitrary targets, as in one example placed at 1 meter and 10 cm calibration positions (302, 304), and finding the best in-focus positions. In other words, the calibration algorithm finds the optimal VCM code value for which the object at calibration position is in focus. Once the VCM DAC values for two calibration positions are found, VCM value corresponding to any other position can be calculated by interpolating/extrapolating between the two calibration points (302, 304). This operation may be performed for many individual image capture devices.

As mentioned above, however, these initial, two-point device-by-device factory calibrations may be costly and time consuming, and conventional calibration still may result in incorrect calibration information anyway, while omitting the calibration may be inadequate and may negatively affect the focusing speed and accuracy.

To avoid all of these disadvantages, the present disclosure provides a self-calibration autofocus process developed to improve the functionality and performance of an autofocus algorithm when (1) on-factory autofocus calibration is not performed or missing, (2) autofocus calibration performed on the production line is inaccurate, and/or (3) autofocus tunings, which among other data include the minimum focusing distance, are incorrect. The autofocus self-calibration algorithm disclosed herein is an unsupervised learning procedure which iteratively estimates the unknown focus range parameters (SOC, EOC and infinity positions) from measurement data collected during one but preferably many autofocus iterations. Calibration data may be stored at a memory, which is updated with newly collected data at certain times during the autofocus loop, and in one case every time the autofocus loop is performed.

Figure 4:
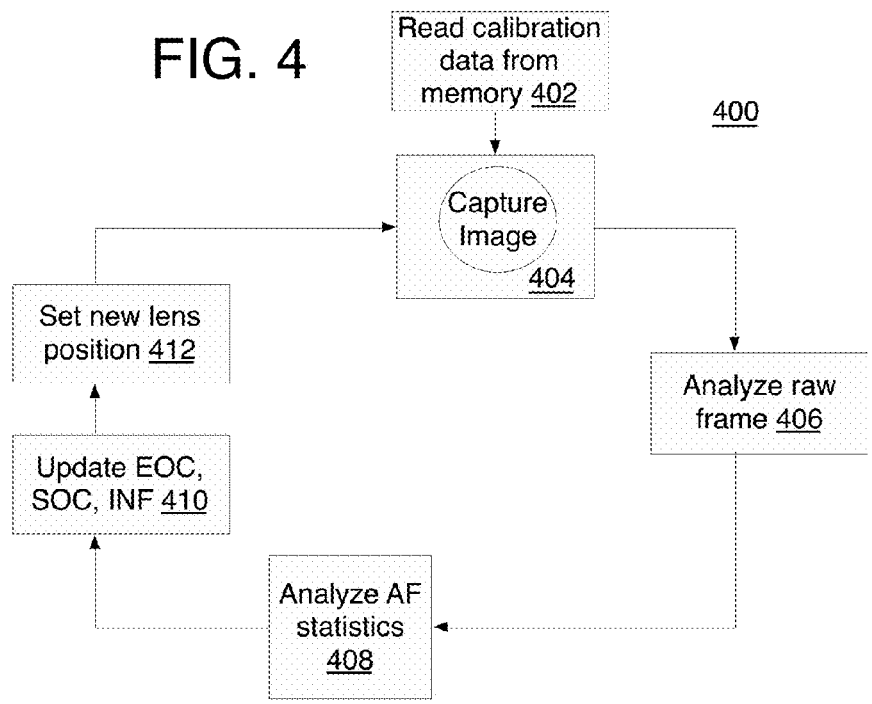
FIG. 4 is a schematic flow chart showing a basic self-calibration process for autofocus on an image capture device according to the description herein.

Referring to FIG. 4, an example process 400 for automatic focus may be used to establish the timing for self-calibration operations. Process 400 also may be referred to as an autofocus loop where the imaging device analyzes autofocus data and determines a lens position setting to position the lens and record a frame for a video sequence or a single still photograph. In the illustrated implementation, process 400 may include one or more operations, functions or actions as illustrated by one or more of operations 402 to 412 numbered evenly. By way of non-limiting example, process 400 may be described herein with reference to example image capture devices 10 and 1800 of FIGS. 1 and 18 respectively, and where relevant.

The process 400 may include read calibration data from memory 402, and the memory may be a binary file, and this operation may include setting the initial focus range parameters based on the data in that file.

If the file with calibration data is not present on the memory of the device (camera is switched on for the first time) initial focusing range is set based on device-by-device two point factory calibration data stored in the non-volatile memory (NVM) data. Other initial calibration methods may include setting the default values based on a golden sample which represents a particular most-perfect imaging device or camera with all the parameters in the middle of the nominal range, or other representation of multiple golden imaging devices. The higher the device-to-device variations at mass production, the larger the deviation in subsequently calculated focus range parameters from the default values.

If a binary container (such as a binary file written into a memory of the device) exists and is not empty, all the data needed for autofocus (AF) self-calibration may be obtained, and by one example, restored from the binary container.

The imaging device or camera may then capture 404 the image, where the sensor(s) of the imaging device capture raw brightness and color pixel data, which is placed in a data stream to a control as raw frame (or picture) data by one example. The calibration data may be stored directly to a memory accessible by the imaging device. By another option, the calibration data may be embedded in the raw data stream.

For general image processing, once the processor receives at least some of the raw image data, it may be analyzed 406 which may include applying pre-processing on the RAW data. This may include noise reduction, pixel linearization, and shading compensation. It also may include resolution reduction, Bayer demosaic, and/or vignette elimination. Once pre-processed, general image statistics information may be calculated. This may include luminance/chrominance values and averages, luminance/chrominance high frequency and texture content, motion content from frame to frame, any other color content values, picture statistical data regarding deblocking control (for example, information controlling deblocking/non-deblocking), RGBS grid, filter response grid, and RGB histograms to name a few examples. The image data and calculated statistics may be stored in a double data rate (DDR) or other sufficient memory, and may then be provided for further analysis. Also, once the image and general statistics are obtained or calculated, the image data and general image statistics may be used by 3A algorithms to make adjustments to the current focus, exposure time, and white balance.

The AF statistics with the calibration data then may be analyzed 408 by an AF control, such as control or component 1812 (FIG. 18), to first update compiled calibration data, which may be in the form of tables and/or histograms to be used for the AF calibration calculations and described in more detail below. This updating of the AF calibration data may be accomplished when (1) the imaging device is turned on, (2) when the autofocus algorithm is performed and when the autofocus algorithm results are actually used to move the lens.

The AF control then may use the update rules for adjusting the SOC, EOC, and infinity locations to refine a focusing range. Once the new EOC, SOC, and infinity positions are updated 410, the AF control then may use the AF algorithm to calculate the focus adjustment of the lens position for the current frame to be captured in order to set 412 the new lens position. In one form, the AF control, such as control 1810, may use i2c protocol that forms the commands for new focus settings, and then sends the new AF settings to the imaging device lens driver or actuator 1808 so that lens hardware on the imaging device may then move the lens. The lens hardware may or may not be considered a part of the AF control 1810.

The autofocus loop may restart with activation to capture the next image. It should be noted, however, the updating of the calibration data, tables, histograms and/or calibrations values (EOC, SOC, and INF) may occur for any combination of the triggers mentioned above in addition to activation of the image device for capturing the next image.

Referring to FIG. 5, an example process 500 for automatic focus with self-calibration for an imaging device described herein is arranged in accordance with at least some implementations of the present disclosure. In the illustrated implementation, process 500 may include one or more operations, functions or actions as illustrated by one or more of operations 502, 504, and/or 506. By way of non-limiting example, process 500 will be described herein with reference to example image capture devices 10 and 1800 of FIGS. 1 and 18 respectively where relevant.

By one implementation of an image capture device, process 500 may include "obtain lens position calibration data used to capture a plurality of frames of a video sequence or still photographs" 502. Thus, the present process 500 may be a continuous process that accumulates lens position calibration data with each autofocus loop or autofocus iteration that is performed. By one form, explained below, the lens position calibration data that is updated for an iteration, at a minimum, may be the sharpness at the lens position. By other alternatives, the lens position calibration data may include lens position numbers, focus values, such as sharpness, for one or more lens position, a change in focus value for one or more lens positions, a count of the number of focus value changes observed for a lens position, a mean focus value change for a lens position, and/or a count of the number of times a lens position is used as a final lens position for capturing a frame or photo, or any combination of these values. By yet other alternatives, the full autofocus loop is performed where the autofocus adjusts a lens position that is used to capture a frame or still image (photo).

Process 500 may include "calculate at least one of: an updated start of controllability (SOC), an updated end of controllability (EOC), updated infinity position (INF), and depending, at least in part, on the lens position calibration data of the plurality of frames or still photographs" 504. These positions may be calculated using focus values that are a sharpness of multiple lens positions as explained in detail below.

Process 500 may include "use at least one of the updated SOC, EOC, and INF to update a range of lens positions to capture a frame or photograph" 506. Once these position(s) are updated or set, then the system may use the positions to interpolate the electrical current to place the lens at other lens positions along a new or updated range of physically available lens positions at the imaging device.

Referring to FIG. 6, a more detailed example process 600 for automatic focus with self-calibration described herein, and is arranged in accordance with at least some implementations of the present disclosure. In the illustrated implementation, process 600 may include one or more operations, functions or actions as illustrated by one or more of operations 602 to 620 numbered evenly. By way of non-limiting example, process 600 will be described herein with reference to example image capture devices 10 and 1800 of FIGS. 1 and 18 respectively where relevant.

Process 600 includes "imaging device power on" 602. This may refer to the turning on of a dedicated digital camera, or it may simply refer to activating a camera application on a smart phone or other computer whether a personal computer or not for example. At a minimum, this powering operation may refer to the powering of the application or device or other logic unit that measures sharpness and performs the autofocus processes.

Process 600 may include "read the calibration data from memory" 604, and in one case, from any of the memories mentioned herein. For one example, this may be from specific binary containers that store the calibration data or that direct the system to the locations of the stored data. The memory may be a permanent memory that accumulates calibration data, and retains certain calibration data even if the imaging device is turned off. When the imaging device is first activated, as mentioned above, the device may have stored default SOC, EOC, and INF values based on a golden (or otherwise assumed to be the most ideal or perfect) device or some sort of averaging or other representative value of a number of such devices. These same default values may be used by multiple imaging devices. Alternatively, the initial SOC, EOC, and INF settings may be set by the conventional device-by-device methods explained above, or other methods.

Referring to FIG. 7A, the self-calibration data in the memory may also have an array, which may be in the form of a table 702 of focus value differences or changes, for a number of individual lens positions, and by one example, each lens position. The table 702, or at least the last row of table 702, and more specifically the data held by the table, may be referred to as a histogram. Thus, by one approach, only the bottom row of table/histogram 702 is actually saved and stored, although other rows may be added to the memory as well. The histogram 702 holds focus value changes, and in one form, a change percentage for each from one iteration to another and calculated by using equation (2) recited below. Thus, change 18 under bin 1 on table 702 means a change of 18% and so on for the change row on table 702. The table, then, is a count of the number of focus value changes for a single lens position up to a maximum value once the table is filled as explained below. By one example, these focus value changes are changes in sharpness from one autofocus iteration to the next iteration. The determination of each change in focus value also is explained below.

As shown by the illustrated example of histogram 702, there may be up to 50 bin locations (or any other number efficient for the system) to store up to J focus value differences (and in this example J=50) for a lens position, and a histogram similar to histogram 702 may be provided for each of I possible lens positions (where in this example I=1024). Another way to say this is that the histogram 702 of focus value changes per each lens position i:$m_{ij}$ is the array of size (I, J) and in the present example (1024, 50) initialized to 0 at the beginning (both 1024 and 50 are configurable, I or 1024 depends on the actuator bit depth (1024==10 bit actuator), J or 50 is the maximum number of records available per every lens position for this example). Every element $m_{ij}$ contains the focus value change per lens position for i. In total, up to J=50 records or 50 changes in focus value per every lens position may be stored.

As mentioned, the focus value change here may be a change in sharpness. Sharpness here refers to the measure of the blurriness at boundaries between areas of an image of different tone and/or color. Generally, sharpness or focus value may be calculated based on a convolution of a high pass filter with the image data calculated line by line. This may be performed at an image signal processor (ISP) for example, and for every image frame. These focus statistics then may be used by an AF control or logic component for processing the data in AF algorithms, and making a decision as to where to move the lens next. In mobile imaging devices equipped with an autofocus mechanism, automatic focusing may be implemented with contrast measurements. It is typically calculated as a sum of image gradients in x (horizontal) direction (alternatively as a sum of gradients in x and y directions) in chroma or luma pixel values (or in other words, on image pixels in Bayer or YUV domain). Modulation transform function (MTF) and spatial frequency response (SFR) are some of the techniques that may be used to measure sharpness. It will be understood that sharpness here may be a relative term measured on a possible scale available for the images and are mentioned without units.

Also, focus value change $m_{ij}$ refers to the change in image sharpness detected within a certain window-of-interest during the lens movement from or to lens position i. By one form, $m_{ij}$ is rounded to the nearest whole number for table 702. Focus value change is a relative measure, calculated with respect to a previous focus value as:

$$m_{ij}, = \frac{FV_i - FV_{i+step}}{FV_i} * 100\% \qquad (2)$$

where step is the size of the lens movement during one autofocus iteration and measured in the number of possible lens positions (0 to 1023). Referring again to table 702 (here as a histogram for lens position 190), the process 600 may record the focus value of the previous iteration $FV_i$, the focus value of the next iteration $FV_{i+step}$, and the focus value change between them per equation (2) for example. The change $m_{ij}$ is recorded for both the lens position i and the lens position i+step. Thus, for the example of table 702, lens position 190 is either i or i+step for each of the iterations or bins. This also means that each change $m_{ij}$ may be recorded twice, once in the histogram of i and once in the histogram of i+step.

Once the buffer is full, the old data is replaced with the new data on the histogram 702 in a FIFO manner, and the total number of focus values in the histogram or buffer remains at 50. Thus, one way to consider this is to state that the new data overwrites, or is saved on top of, the older data. It will be understood the data provided by table 702 may be provided in many different forms, wherein for example only the last row and the last focus value measured is saved to be compared to the next new measurement with the next iteration. Many different examples exist. Also, it will be understood that every iteration need not be recorded. It may record every other iteration, or some other skipped number of iterations may be used. Otherwise, iterations after only certain triggers but not others may be used. Thus, an iteration may be formed only when the imaging device is first activated or only when a user depresses an activation button to capture an image, and so forth, even though, while possibly faster, such a less robust process may result in less accurate results.

Once set for operation, the collected histogram is not typically reset or emptied. In one form, it may be emptied during software modification or updating, which may change the way the data is collected or processed.

Once the focus value changes are placed and accumulated in the histograms (also referred to as the focus value change histograms or tables), the change values may be combined or otherwise used to determine updated SOC and EOC values. By one form, each table 702 may be used to calculate a mean focus value change (proportional to image sharpness) over the recorded 50 or less iterations of changes, whatever is present, and for each lens position that has focus value changes as described in greater detail below.

Based on this histogram (such as table 702) of $m_{ij}$, the mean focus value for the recorded lens positions in the histogram may be based on selected focus value changes in the histogram or all of the focus value changes in the histogram for a single lens position. Thus, the mean focus value change may be referred to as the average over the recorded number of focus value change records for a lens position, $\Sigma_j m_{ij}$.

The process 600 may include "update focus range parameters based on calibration data" 606. Thus, when the tables 702 are empty upon first activation, the default values are used. Once self-calibration data is collected to start filling tables 702, such as during a prior use of the imaging device, which was then turned off, and is now reactivated, then the tables may be used to calculate the initial reference EOC and SOC, and INF values which can then be used to interpolate the electrical drive current value for other lens positions.

For the analysis 608 of a frame n, it may include "collect data for frame n on top of previously collected data" 610. Specifically, autofocus statistics including self-calibration data may be compiled and/or calculated for updating after individual or every autofocus loop or other autofocus iterations. By one example, as mentioned previously, this updating of the AF self-calibration data may be initiated when (1) the imaging device is turned on, (2) when the autofocus algorithms are performed and when the autofocus algorithm results are actually used to move the lens. It also may be performed when other triggers are activated or any combinations of these. The autofocus algorithms may be performed when a user depresses, or partially depresses, an actuator to capture a picture for example, in addition to any of the other times mentioned herein.

The updated calibration data may include a histogram of focus value changes per each lens position i: $m_{ij}$ (table 702), where j is the index of a histogram ring buffer of size J which can store multiple focus value changes per each lens position. This may be the table 702 for individual or each lens position where J is 50 in this example. The updated calibration data also may include basic statistics calculated from the histogram: sum of focus value changes and mean focus value change per each lens position i as shown on tables 700 to 1200 (FIGS. 7-12); and a histogram of final lens positions (FLP) $l_i$ used for infinity (INF) position calculation, and updated after every focusing loop with the number of occurrences as best in-focus per each lens position i.

Referring to FIGS. 7-12, one or more buffers are represented by tables 700 to 1200 that have a row for the mean focus value change for individual lens positions, and in one example, for every lens position, although other alternatives are contemplated. Buffers 700 to 1200 cooperatively show the calibration statistics for a portion of the range of 0 to 1023 lens positions. Table 700 starts with position 76 while table 1200 ends with position 303 which covers most of the possible SOC lens positions for a particular camera module. In the buffer, or portion of the buffer, 700, each column corresponds to a lens position, and in turn, one of the focus value change tables, such as histogram 702, corresponds to each column. The top row of the buffer 700 is the mean focus value change of the focus value changes listed on its corresponding focus value change table or histogram 702. The second row indicates the lens position. The third row indicates the count of the number of focus value changes that are on the focus value histogram, and is factored into the mean value (up to 50 in the illustrated example based on histogram 702), and the bottom row indicates the number of times the particular lens position was used as the final lens position. Tables or histograms 800-1200 are similar. By one approach, however, while the mean is calculated for the last 50 values or maximum provide by the focus value histograms 702 only, the count in the buffer 700-1200 may actually provide the total count for all time. Knowing the total count can be used to easily find the last record in the buffer by applying the modulus operator and taking the remainder.

As shown on tables 700-1200, elements with lens position less than about lens position 160 are sparsely populated, i.e., smaller mean (indicating that probably no real lens movement happened for those records), and very few occurrences exist where these lens positions are used as a best in-focus position. The histogram becomes much more populated for lens positions between 200 and 300 (tables 1000 to 1200). This indicates that the AF algorithm uses this range in the majority of situations.

Figures 10, 11, 12:
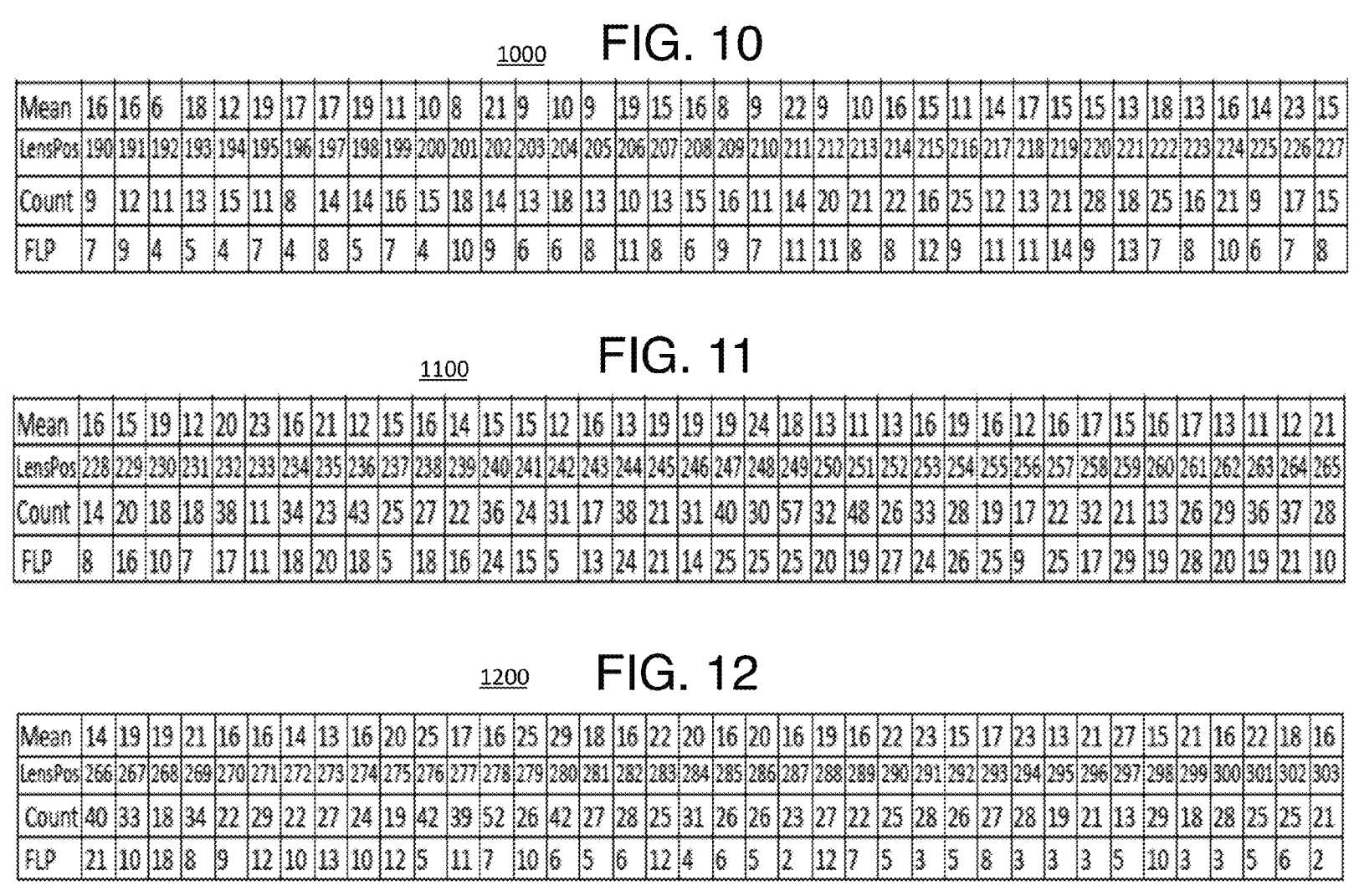

As one example, table 702 may be provided for lens position 190. Thus, adding up the focus value changes in table 702 and dividing by nine since nine focus value changes are provided gives a mean of 16 and a count of 9 (e.g., mean FV equals $(m_{190.1}+M_{190.2}+\ldots m_{190.9})/9$. This is provided in the first column on histogram 1000 (FIG. 10). FLP equal to 7 means this position has been used as the best in-focus position seven times.

The process 600 also may include "compute EOC, SOC, and/or INF estimates" 612, which may be based on the histograms, the following equations, and/or the operations established herein. The self-calibration algorithm may be considered to be a set of update rules which iteratively adjust the default SOC, EOC and INF values with new SOC, EOC and INF parameter estimates computed with equations or rules (3), (4), and (6) recited below, trying to minimize the difference between the default values and the new values. The speed of convergence depends on how large is the discrepancy between the default and the new parameters.

SOC is calculated as an average over a set of lens positions i at FAR end (referring to the physical FAR end closer to the imaging device sensor) where significant focus value change has been detected:

$$SOC = \frac{\sum_{i \in A} i * S_i^{FAR}}{\sum_{i \in A} S_i^{FAR}} \quad (3)$$

where A is a finite set which includes the first N lens positions at FAR end with focus value changes that meets a condition. By one form, the condition is whether the focus value change is higher than a predefined threshold T, and $S_i^{FAR}$ is the number of focus value changes at FAR end recorded for lens position i, or in other words, the count of the number of focus value changes in the histogram of lens position i. By one example T is set at 8.

EOC is calculated as an average over a set of lens positions i at NEAR end (referring to the physical NEAR end farther away from the imaging device sensor) where significant focus value change has been detected:

$$EOC = \frac{\sum_{i \in B} i * S_i^{NEAR}}{\sum_{i \in B} S_i^{NEAR}} \quad (4)$$

where B is a limited set which includes the last N lens positions at NEAR end with focus value change that meets a condition, such as being higher than a predefined threshold T, and $S_i^{NEAR}$ is the number of focus value changes at NEAR end recorded per lens position i, or in other words, the count of focus value changes in the histogram for lens position i.

When the amount of collected data is small, and the histograms are sparsely populated, N is fixed and may be the same for each end (for both SOC and EOC) although N need not always be the same for both. By one example, N may be initially set as 5 as a default. As the histogram becomes filled, N is chosen as a percentile (e.g. 1%) of the total number of histogram records. For one example, the estimates for SOC and EOC is an average of those lens positions which have the mean focus value change above certain threshold T (chosen as 8). For this example, if N=5 lens positions from FAR end, for SOC, and in the illustrated example from the buffers 700-800 (FIGS. 7-8), then SOC= (111*2+115*1+123*1+124*2+135*1)/7=120.42; where 111, 115, 123, 124, and 125 are the first N (or 5 here) lens positions i from the relevant end with mean focus values over the threshold. The numbers 2, 1, 1, 2, and 1 are respectively the count of focus values forming each mean ($S_i^{NEAR}$), and the denominator (7) is simply the sum of the number of focus values.

Figure 13:
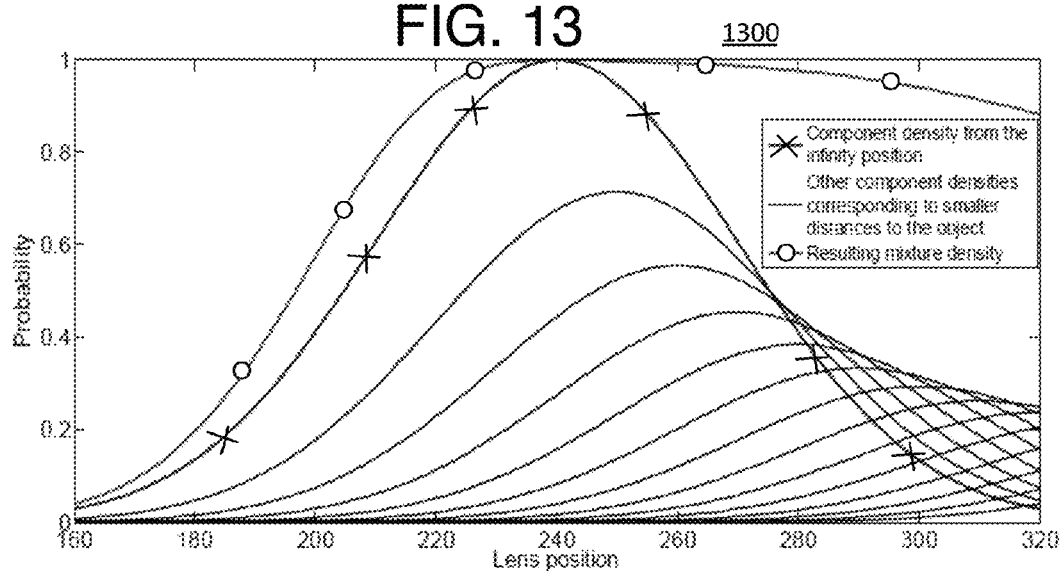
FIG. 13 is a chart showing a Gaussian mixture model for observed data around a true infinity lens position.
Figure 14:
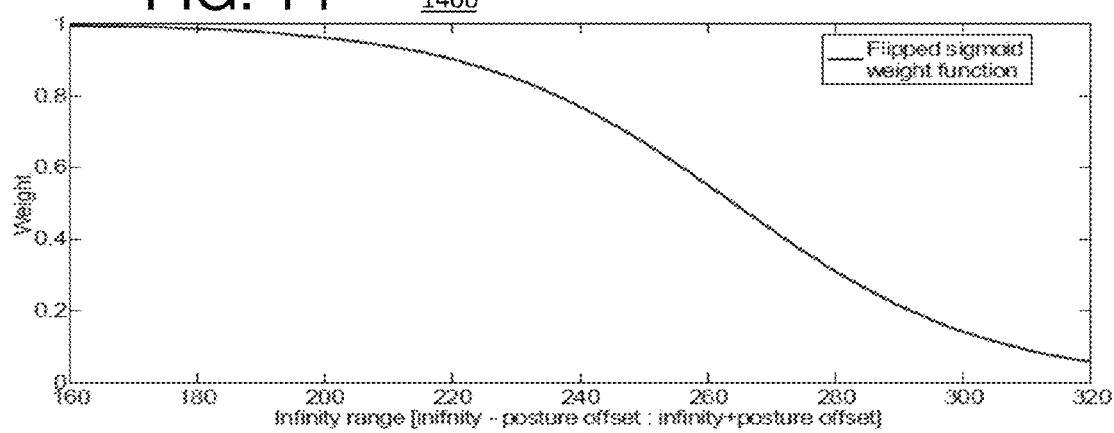
FIG. 14 is a chart showing a Sigmoid weight function indicating probability of final lens positions of true infinity estimate.

Referring to FIGS. 13-14, computing the infinity estimates may be performed as follows. Infinity position, when the imaging device is held in a horizontal orientation, may be an essential reference point for an autofocus algorithm. The infinity position estimation is performed based on a histogram of final lens positions used as the infinity position as shown on the bottom row of buffer 700-1200 (FIGS. 7-12). An example of a Gaussian mixture model (GMM) 1300 (FIG. 13) is provided for the observed data around the true infinity lens position (240 in this example). The model shows a graphing of probability versus final lens position. A curve is provided for component density from the infinity position, other curves corresponding to smaller distances to the object, and a resulting mixture density curve. The Gaussian mixture model 1300 may be a mixture of K components, each belonging to the Gaussian distribution with mean $\mu_k$ and standard deviation $\sigma_k$:

$$f(x | \mu, \sigma) = \sum_k p_k * f(x | \mu_k, \sigma_k) \quad (5)$$

where $f_k$ is the component density for k-th component, where k=1, ..., K. Each component k represents certain distance from the object of interest. Every final lens position generated by focusing the camera at a distance k, follows the probability density function $f(x|\mu_k, \sigma_k)$. For the sake of simplicity, it is assumed that each density function corresponds to certain range of distances (e.g. [1 meter: Infinity], [90 cm–1 meter], etc.) and has the same standard deviation proportional to the lens gravity force offset g. The objective is to estimate the mean for the largest component corresponding to the infinity position (more specifically to the range from infinity to approximately 1 meter) given the observed data. The arithmetic mean of the GMM provides a positively biased estimate of the infinity position because the observation data also contains samples from other distances than infinity.

Instead, the process 600 here generates flipped Sigmoid (s-type) weight function $s_i$ on a graph 1400 (FIG. 14) that graphs weight versus infinity range (infinity—posture offset: infinity+posture offset), and calculates the weighted mean of the observed data as follows:

$$\hat{\mu}_{INF} = \frac{\sum_{i \in I} (s_i * i * l_i)}{\sum_{i \in I} (s_i * l_i)} \quad (6)$$

Figure 14A:
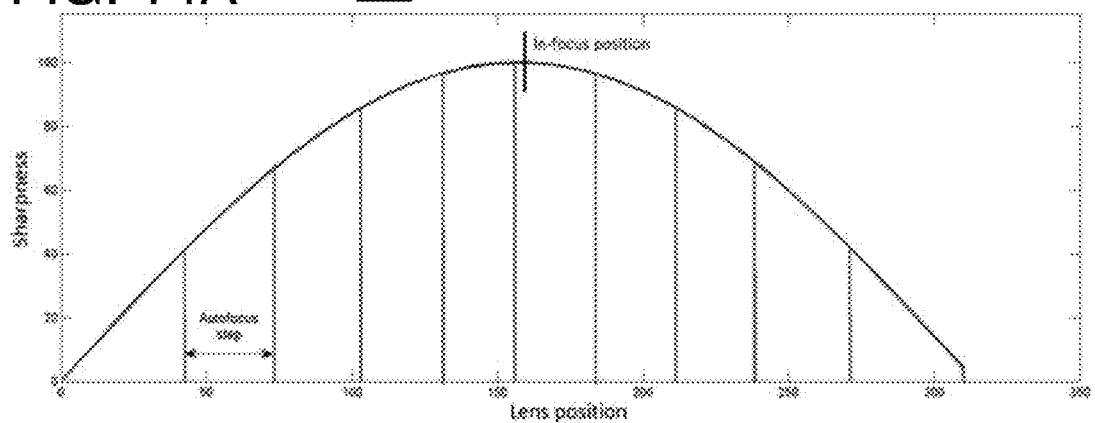
FIG. 14A is a graph showing a curve of infinity position versus focus sharpness.

The Sigmoid weight function describes the probability of final lens position belonging to a true infinity estimate, where $s_i$ is the logistic function of the form:

$$s_i = 1 - \frac{1}{1 + e^{(\hat{\mu}_{INF} - g + 2*g*k - i)*p}} \quad (7)$$

where k and p are the coefficients affecting the shape of the weight function. Weight function describes the weight of each lens position to the final mean, and roughly approximates the difference between the mixture density and the density of the infinity component. Weighted sum is computed over the range $I = [\hat{\mu}_{INF} - g: \hat{\mu}_{INF} + g]$, i.e., the range which covers the possible distribution of final lens positions from an object of interest being placed at infinity. By one example approach, if $\hat{\mu}_{INF} = 240$ as in graph 1400, and g=80, then the process may calculate the weighted sum which is the weight calculated based on the equation (7). As mentioned above, the histogram of final lens positions (FLP) $l_i$ (the last row of the buffer 700-1200) also may be provided, and may be the array of the size (1024, 1) initialized to 0. Every element of $l_i$ is the number of occurrences per lens position i, i.e., how many times this particular lens position has been used as a final best in-focus position. The final lens position is the resulting lens position corresponding to the peak of a focus curve 1402 (FIG. 14A) found during the autofocus iterations. Autofocus algorithm is a hill climbing search which attempts to maximize the sharpness of the image by incrementally adjusting the lens position through the whole range and measuring the focus value.

Once the EOC, SOC, and/or INF values are updated, the process 600 may then include a determination whether "new estimates same as old estimates?" 614. If so, the process directly loops for recalculating the SOC, EOC, and INF values for the next AF iteration (operation 610). If not, the system updates 616 the EOC, SOC, and/or INF parameters, and then loops for the next AF iteration. By one approach, the looping may continue until the image device is powered-off 618. Once powering off is indicated, the process 600 may include "save the updated calibration data back to memory, and write to the memory device" 620 in order to store the latest updates and calibration data until the imaging device and autofocus is reactivated.

Referring to FIG. 15, an example process 1500 is provided for automatic focus with self-calibration while an image capture device is recording a video sequence, and is arranged in accordance with at least some implementations of the present disclosure. In the illustrated implementation, process 1500 may include one or more operations, functions or actions as illustrated by one or more of operations 1502 to 1514. By way of non-limiting example, process 1500 will be described herein with reference to example image capture devices 10 and 1800 of FIGS. 1 and 18 respectively where relevant.

Process 1500 may include "run a single AF iteration" 1502. The initiation of the AF iteration is explained elsewhere herein. The iteration may include collecting calibration data, placing the data in histograms, determining counts and calculating the mean focus values, and calculating updated SOC, EOC, and INF, values, and then processing of AF algorithms to determine an acceptable lens position. The system tests whether "search has finished?" 1504 and specifically whether a search for a lens position is complete. The process 1500 may then continue to check whether the focus has been found 1506. If so, the process 1500 may continue with "AF is locked. Focus succeeded" 1508, and the lens position is set and may be used to capture a frame. The process 1500 may continue to determine whether a scene change exists 1510. If not, the system loops to maintain the AF locked on the last focus value and continue monitoring for a scene change.

If the scene has changed, or when the focus has not been found after a search for a focus value, the process 1500 continues with "focus has been lost AF is in idle state". In this state, the AF self-calibration unit is waiting for a scene or view that can be used to obtain data to set a lens position. The system monitors whether "scene is stable" 1514, and loops to the idle state until it is stable. Once the scene is stable, the process loops back to run another AF iteration.

Referring to FIG. 16, a process 1600 is provide for automatic focus with self-calibration, while an image capture device is capturing still images and that is arranged in accordance with at least some implementations of the present disclosure. In the illustrated implementation, process 1600 may include one or more operations, functions or actions as illustrated by one or more of operations 1602 to 1618. By way of non-limiting example, process 1600 will be described herein with reference to example image capture devices 10 and 1800 of FIGS. 1 and 18 respectively where relevant.

Process 1600 may include "still AF request" 1602. As mentioned, the initiation of the AF iteration may be activated by a user depressing an activation button on the imaging device. Once activated, process 1600 may continue with a determination whether "AF result from preview is available" 1604. A preview on a digital camera may have the calibration data stored by a control and in a memory. If so, it is determined whether "AF is locked focus succeeded?" 1606. If so, the "AF is locked and the focus succeeded" 1608, and the lens position is set and may be used to capture the still image. If not, or if no preview is available, then the process 1600 continues with "run a single AF iteration" 1610, and as described before.

The process 1600 may continue with "search has finished" 1612, and specifically whether the search for a new lens position has finished. If not, it is determined whether a timeout 1614 is being taken. If not, the process loops to start another AF iteration run. If so, the focus failed 1618. The system or the user may try again. If the search is complete, it is determined whether the focus is found 1616. If so, the AF is locked, the focus succeeded, and the lens position is set and may be used. If not, the focus failed 1618.

Referring to FIG. 17, process 1700 illustrates the operation of a sample image processing system 1800 for self-calibration in accordance with at least some implementations of the present disclosure. In more detail, in the illustrated form, process 1700 may include one or more operations, functions or actions as illustrated by one or more of actions 1702 to 1720 numbered evenly. By way of non-limiting example, process 1700 will be described herein with reference to FIG. 18. Specifically, system 1800 includes an AF self-calibration unit 1816 and an AF algorithm unit 1814. The operation of the system may proceed as follows.

The process 1700 may include indication, by commands or flags for example, that the AF iteration has been actuated 1701. The process 1700 may continue with "receive data for AF iteration" 1702. This may include contrast values and lens position value (or electrical current values that indicate lens position if not the lens position number itself) for the frame.

The process 1700 may include "enter calibration data on lens position histograms" 1704. As explained previously, this may include using the received data to calculate focus value changes for multiple lens positions and from one AF iteration to another AF iteration, and entering the focus value changes on the corresponding histograms such as histogram 702 (FIG. 7A). This results in a count of focus value changes for each lens position involved in focus value changes, whether the lens position was associated with either the first iteration (as i) or second AF iteration (as i+step) related to the focus value change.

The process 1700 may include "calculate mean focus value change for individual lens positions" 1706, and particularly for individual or each lens position with focus value changes, and enter 1708 data on the mean FV buffer, as with buffer 700-1200 (FIGS. 7-12). The SOC, EOC, and INF may be updated 1710, and the data for the updated values provided, or made accessible 1712, to the AF statistics unit. The AF self-calibration unit may hold or loop to process the next AF iteration 1714.

The AF statistics unit may then "obtain statistics data for current autofocus iteration" 1716, "calculate new autofocus lens position" 1718 by using AF algorithms for example, and "provide lens position to imaging device control" 1720. The control may then set and use the lens position to capture the next frame or still photo.

In addition, any one or more of the operations of FIGS. 4-6, and 15-17 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 18:
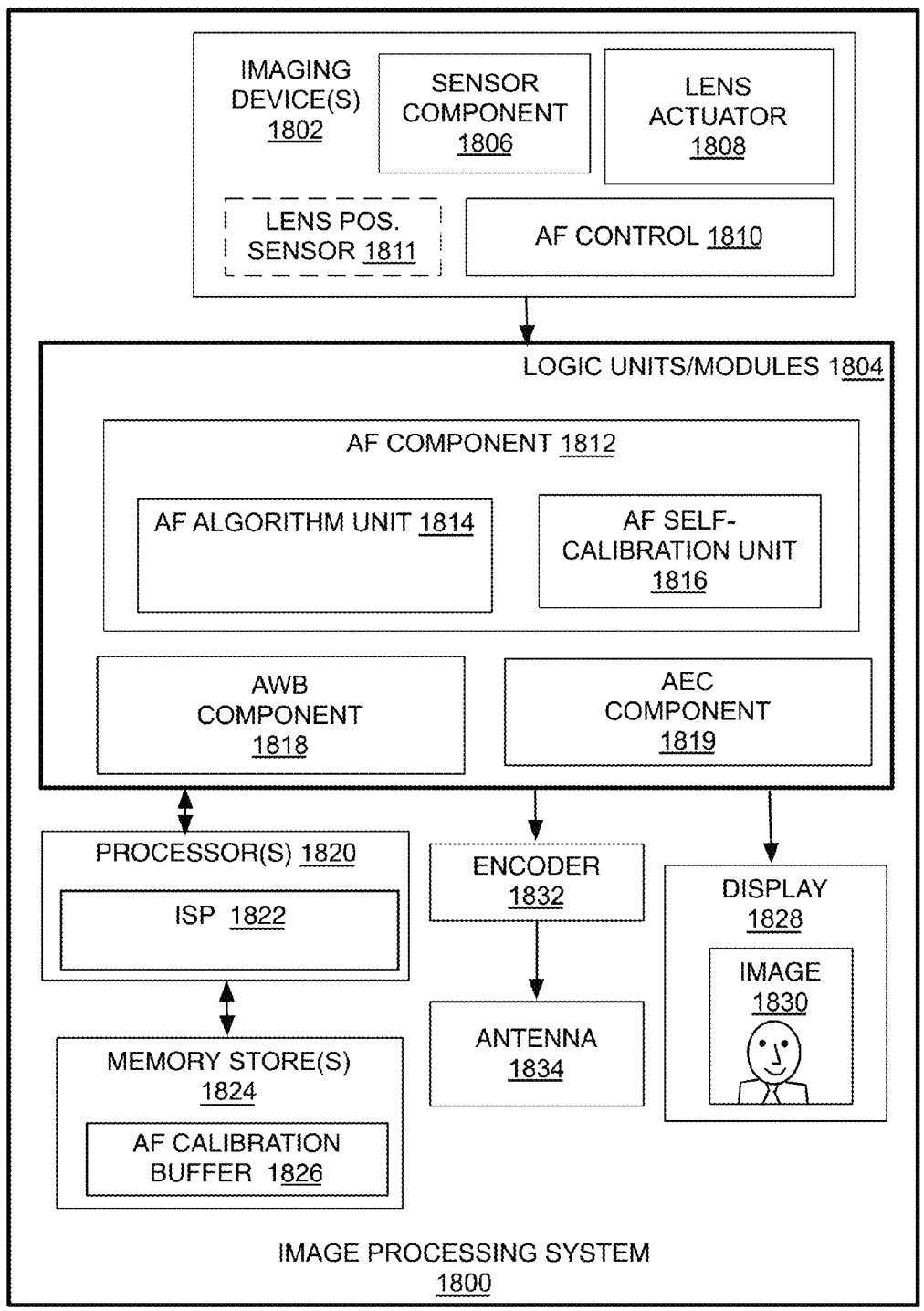
FIG. 18 is an illustrative diagram of an example system.

Referring to FIG. 18, an example image processing system 1800 is arranged in accordance with at least some implementations of the present disclosure. In various implementations, the example image processing system 1800 may have an imaging device 1802 to form or receive captured image data. This can be implemented in various ways. Thus, in one form, the image processing system 1800 may be a digital camera or other image capture device, and imaging device 1802, in this case, may be the camera hardware and camera sensor software, module, or component 1812. In other examples, imaging processing system 1800 may have an imaging device 1802 that includes or may be a camera, and logic modules 1804 may communicate remotely with, or otherwise may be communicatively coupled to, the imaging device 1802 for further processing of the image data.

In either case, such technology may include a camera such as a digital camera system, a dedicated camera device, or an imaging phone, whether a still picture or video camera or some combination of both. Thus, in one form, imaging device 1802 may include camera hardware and optics including one or more sensors as well as auto-focus, zoom, aperture, ND-filter, auto-exposure, flash, and actuator controls. These controls may be part of a sensor module or component 1806 for operating the sensor. The sensor component 1806 may be part of the imaging device 1802, or may be part of the logical modules 1804 or both. Such sensor component can be used to generate images for a viewfinder and take still pictures or video. The imaging device 1802 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 1802 may be provided with an eye tracking camera.

The imaging device 1802 also may have a lens actuator 1808 that has a lens and a lens driver or driver logic that receives commands to move the lens and applies an electrical current to move the lens. An autofocus (AF) control 1810 may be provided on the imaging device as well to collect calibration data from sensors and the lens actuator, and to transmit the data to memories and/or the AF component 1812. Optionally, the imaging device 1802 also may have a lens position sensor 1811 to confirm lens positions if needed.

In the illustrated example, the logic modules 1804 may include the AF component 1812 that, in turn, includes an AF algorithm unit 1814 to compute a desired new current lens position, and an AF self-calibration unit 1816 that uses the self-calibration data as described above to calculate updated EOC, SOC, and INF values. The logic modules 1804 also may include an automatic white balance (AWB) module 1818, and an automatic exposure control (AEC) module 1819. The 3A components including the AF component 1812 may be operated by, or even entirely or partially located at, processor(s) 1820, and which may include an ISP 1822. The logic modules may be communicatively coupled to the components of the imaging device 1802 in order to receive raw image data that includes the self-calibration data described herein. Optionally, the self-calibration data may be provided by a data stream separate from the raw image data stream. In these cases, it is assumed the logic modules 1804 are considered to be separate from the imaging device. This need not be so, and the logic modules very well may be considered to be part of the imaging device as well.

The image processing system 1800 may have one or more processors 1820 which may include a dedicated image signal processor (ISP) 1822 such as the Intel Atom, memory stores 1824 which may or may not hold the AF calibration buffers 1826 as well as histograms and tables mentioned herein, one or more displays 1828 to provide images 1830, encoder 1832, and antenna 1834. In one example implementation, the image processing system 100 may have the display 1828, at least one processor 1820 communicatively coupled to the display, at least one memory 1824 communicatively coupled to the processor and having a circular buffer 1826 by one example for storing the self-calibration as explained above. The encoder 1832 and antenna 1834 may be provided to compress the modified image date for transmission to other devices that may display or store the image. It will be understood that the image processing system 1800 may also include a decoder (or encoder 1832 may include a decoder) to receive and decode image data for processing by the system 1800. Otherwise, the processed image 1830 may be displayed on display 1828 or stored in memory 1824. As illustrated, any of these components may be capable of communication with one another and/or communication with portions of logic modules 1804 and/or imaging device 1802. Thus, processors 1820 may be communicatively coupled to both the image device 1802 and the logic modules 1804 for operating those components. By one approach, although image processing system 1800, as shown in FIG. 18, may include one particular set of blocks or actions associated with particular components or modules, these blocks or actions may be associated with different components or modules than the particular component or module illustrated here.

Figure 19:
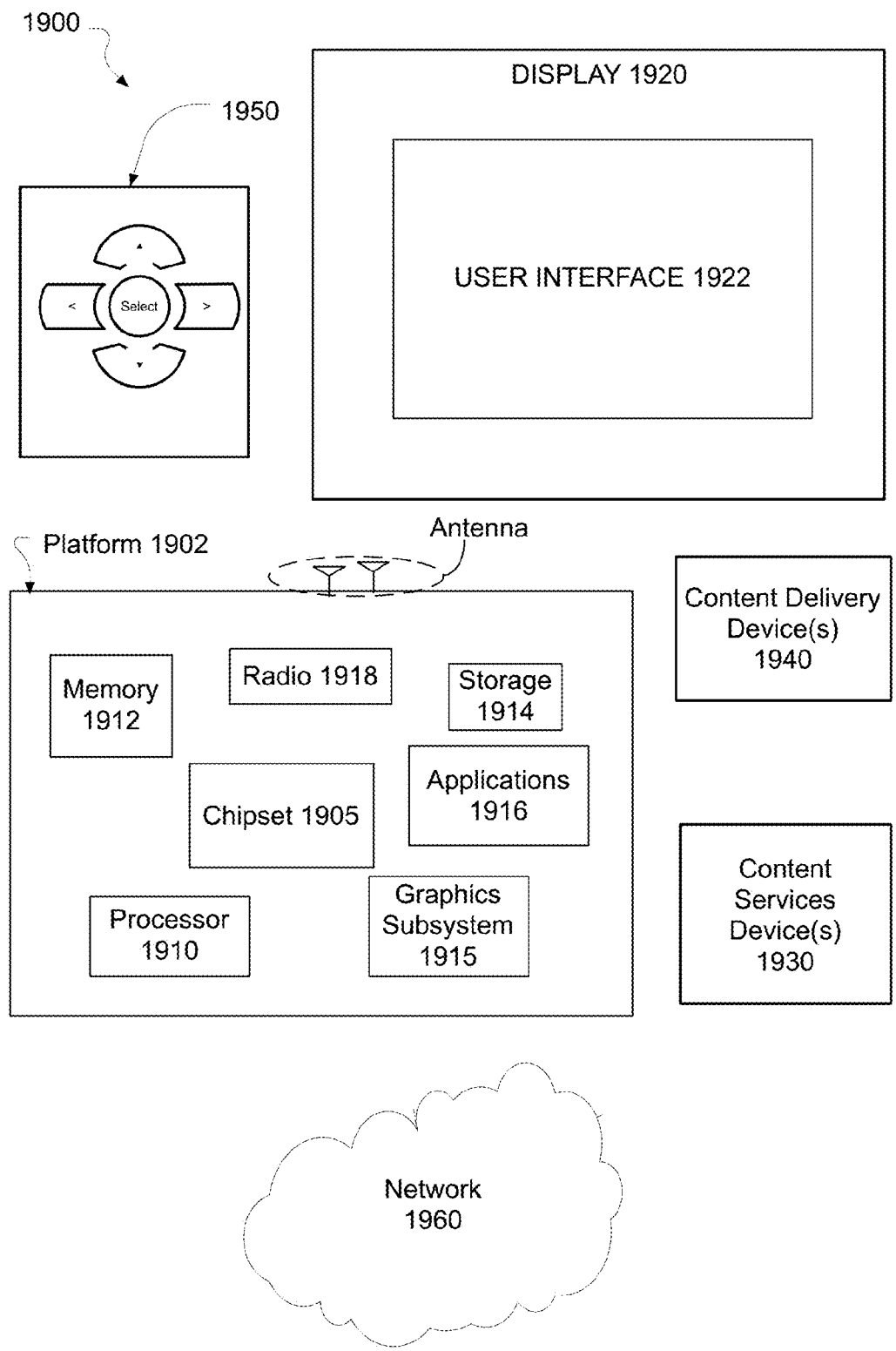
FIG. 19 is an illustrative diagram of another example system.

Referring to FIG. 19, an example system 1900 in accordance with the present disclosure operates one or more aspects of the image processing system described herein. It will be understood from the nature of the system components described below that such components may be associated with, or used to operate, certain part or parts of the image processing system described above. In various implementations, system 1900 may be a media system although system 1900 is not limited to this context. For example, system 1900 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1900 includes a platform 1902 coupled to a display 1920. Platform 1902 may receive content from a content device such as content services device(s) 1930 or content delivery device(s) 1940 or other similar content sources. A navigation controller 1950 including one or more navigation features may be used to interact with, for example, platform 1902 and/or display 1920. Each of these components is described in greater detail below.

In various implementations, platform 1902 may include any combination of a chipset 1905, processor 1910, memory 1912, storage 1914, graphics subsystem 1915, applications 1916 and/or radio 1918. Chipset 1905 may provide intercommunication among processor 1910, memory 1912, storage 1914, graphics subsystem 1915, applications 1916 and/or radio 1918. For example, chipset 1905 may include a storage adapter (not depicted) capable of providing intercommunication with storage 1914.

Processor 1910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1910 may be dual-core processor(s), dual-core mobile processor(s), and so forth.

Memory 1912 may be implemented as a volatile memory device such as, but not limited to, a Random Access Memory (RAM), Dynamic Random Access Memory (DRAM), or Static RAM (SRAM).

Storage 1914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1914 may include technology to increase the storage performance enhanced protection for valuable digital media when multiple hard drives are included, for example.

Graphics subsystem 1915 may perform processing of images such as still or video for display. Graphics subsystem 1915 may be a graphics processing unit (GPU) or a visual processing unit (VPU), for example. An analog or digital interface may be used to communicatively couple graphics subsystem 1915 and display 1920. For example, the interface may be any of a High-Definition Multimedia Interface, Display Port, wireless HDMI, and/or wireless HD compliant techniques. Graphics subsystem 1915 may be integrated into processor 1910 or chipset 1905. In some implementations, graphics subsystem 1915 may be a stand-alone card communicatively coupled to chipset 1905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1918 may operate in accordance with one or more applicable standards in any version.

In various implementations, display 1920 may include any television type monitor or display. Display 1920 may include, for example, a computer display screen, touch screen display, video monitor, television-like device, and/or a television. Display 1920 may be digital and/or analog. In various implementations, display 1920 may be a holographic display. Also, display 1920 may be a transparent surface that may receive a visual projection. Such projections may convey various forms of information, images, and/or objects. For example, such projections may be a visual overlay for a mobile augmented reality (MAR) application. Under the control of one or more software applications 1916, platform 1902 may display user interface 1922 on display 1920.

In various implementations, content services device(s) 1930 may be hosted by any national, international and/or independent service and thus accessible to platform 1902 via the Internet, for example. Content services device(s) 1930 may be coupled to platform 1902 and/or to display 1920. Platform 1902 and/or content services device(s) 1930 may be coupled to a network 1960 to communicate (e.g., send and/or receive) media information to and from network 1960. Content delivery device(s) 1940 also may be coupled to platform 1902 and/or to display 1920.

In various implementations, content services device(s) 1930 may include a cable television box, personal computer, network, telephone, Internet enabled devices or appliance capable of delivering digital information and/or content, and any other similar device capable of unidirectionally or bidirectionally communicating content between content providers and platform 1902 and/display 1920, via network 1960 or directly. It will be appreciated that the content may be communicated unidirectionally and/or bidirectionally to and from any one of the components in system 1900 and a content provider via network 1960. Examples of content may include any media information including, for example, video, music, medical and gaming information, and so forth.

Content services device(s) 1930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1902 may receive control signals from navigation controller 1950 having one or more navigation features. The navigation features of controller 1950 may be used to interact with user interface 1922, for example. In embodiments, navigation controller 1950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1950 may be replicated on a display (e.g., display 1920) by movements of a pointer, cursor, focus ring, or other visual indicators displayed on the display. For example, under the control of software applications 1916, the navigation features located on navigation controller 1950 may be mapped to virtual navigation features displayed on user interface 1922, for example. In embodiments, controller 1950 may not be a separate component but may be integrated into platform 1902 and/or display 1920. The present disclosure, however, is not limited to the elements or in the context shown or described herein.

In various implementations, drivers (not shown) may include technology to enable users to instantly turn on and off platform 1902 like a television with the touch of a button after initial boot-up, when enabled, for example. Program logic may allow platform 1902 to stream content to media adaptors or other content services device(s) 1930 or content delivery device(s) 1940 even when the platform is turned "off." In addition, chipset 1905 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1900 may be integrated. For example, platform 1902 and content services device(s) 1930 may be integrated, or platform 1902 and content delivery device(s) 1940 may be integrated, or platform 1902, content services device(s) 1930, and content delivery device(s) 1940 may be integrated, for example. In various embodiments, platform 1902 and display 1920 may be an integrated unit. Display 1920 and content service device(s) 1930 may be integrated, or display 1920 and content delivery device(s) 1940 may be integrated, for example. These examples are not meant to limit the present disclosure.

In various embodiments, system 1900 may be implemented as a wireless system, a wired system, or a combination of both. When implemented as a wireless system, system 1900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 19.

Figure 20:
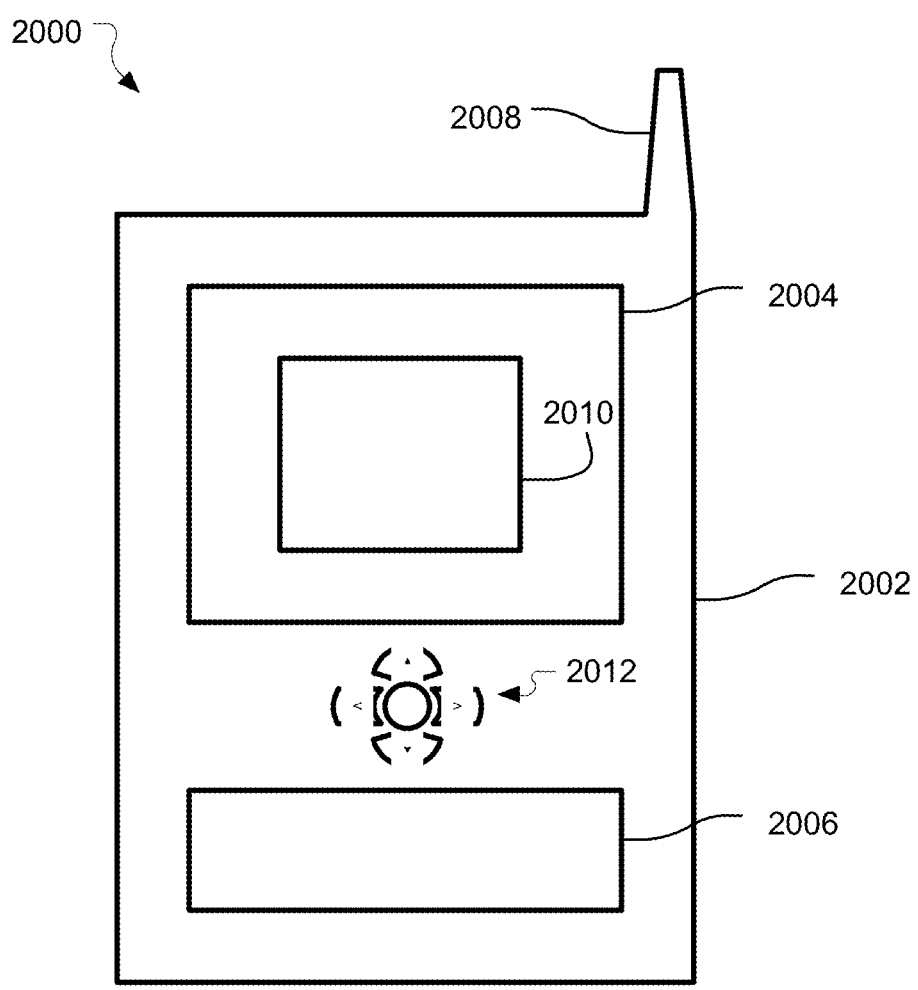
FIG. 20 illustrates another example device, all arranged in accordance with at least some implementations of the present disclosure.

Referring to FIG. 20, a small form factor device 2000 is one example of the varying physical styles or form factors in which system 1900 may be embodied. By this approach, device 2000 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 20, device 1000 may include a housing 2002, a display 2004 including a screen 2010, an input/output (I/O) device 2006, and an antenna 2008. Device 2000 also may include navigation features 1012. Display 2004 may include any suitable display unit for displaying information appropriate for a mobile computing device. I/O device 2006 may include any suitable I/O device for entering information into a mobile computing device. Examples for I/O device 2006 may include an alphanumeric keyboard, a numeric keypad, a touch pad, input keys, buttons, switches, rocker switches, microphones, speakers, voice recognition device and software, and so forth. Information also may be entered into device 2000 by way of microphone (not shown). Such information may be digitized by a voice recognition device (not shown). The embodiments are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of automatic focus with self-calibration for an imaging device comprises obtaining lens position calibration data used to capture a plurality of frames of a video sequence or still photographs; calculating at least one of: an updated start of controllability (SOC), an updated end of controllability (EOC), updated infinity position (INF), and depending, at least in part, on the lens position calibration data of the plurality of frames or still photographs; and using at least one of the updated SOC, EOC, and INF to update a range of possible lens positions to capture a frame or photograph.

By another implementation, the method may comprise the SOC or EOC is a lens position derived by using a set number of lens positions from either the start or end lens position of a range of physically possible lens positions provided by the imaging device, and wherein the set number of lens positions each being associated with a change in a focus value from autofocus iteration to iteration wherein the lens position is set at at least one of the iterations, wherein the change meets a condition, wherein the change in focus value is a change in sharpness between autofocus iterations wherein at least sharpness of the lens position is calculated, and wherein calculating the SOC or EOC comprises deriving the SOC or EOC by using a preset number of lens positions along a range of physically possible lens positions and each lens position of the set having a change in a focus value from autofocus iteration to iteration that meets a condition.

The method may also comprise calculating the updated INF position as a weighted mean sum using a possible distribution of final lens positions (I), a weight ($s_i$) being the weight of individual final lens positions, and the available lens positions (i); initially setting the same default SOC and EOC values on a plurality of imaging devices; updating the lens position calibration data upon at least one of: when the imaging device is turned on, when autofocus algorithms are performed, and when autofocus algorithms are performed and an adjusted lens position resulting from the autofocus algorithms is used to capture a frame or still photograph; using a histogram that counts the number of times individual lens positions have focus value changes between autofocus iterations; calculating a mean focus change over the count for individual lens positions; using the number of the lens position associated with selected mean focus value changes to determine the updated SOC, EOC, or INF, wherein the focus value change is counted for both a previous lens position and a subsequent lens position associated with the focus value change; and forming a histogram that counts the number of times a lens position is used as the best in-focus final lens position to use to calculate the updated infinity position.

By yet another implementation, a computer-implemented system of autofocus with self-calibration comprising: a display; at least one processor communicatively coupled to the display; at least one memory communicatively coupled to at least one processor and storing lens position calibration data used to capture a plurality of frames of a video sequence or a plurality of still photographs; and an autofocus (AF) self-calibration unit communicatively coupled to the processor, and to: obtain lens position calibration data used to capture a plurality of frames of a video sequence or still photographs; calculate at least one of: an updated start of controllability (SOC), an updated end of controllability (EOC), updated infinity position (INF), and depending on, at least in part, the lens position calibration data of the plurality of frames or still photographs; and use at least one of the updated SOC, EOC, and INF to update a range of possible lens positions to capture a frame or photograph.

By another example, the system includes the SOC or EOC is a lens position derived by using a set number of lens positions from either the start or end lens position of a range of physically possible lens positions provided by the imaging device, wherein the set number of lens positions each being associated with a change in a focus value from autofocus iteration to iteration wherein the lens position is set at at least one of the iterations, and wherein the change meets a condition; wherein the change in focus value is a change in sharpness between autofocus iterations wherein at least sharpness of the lens position is calculated; wherein calculating the SOC or EOC comprises deriving the SOC or EOC by using a preset number of lens positions along a range of physically possible lens positions and each lens position of the set having a change in a focus value from autofocus iteration to iteration that meets a condition; wherein the autofocus unit calculates the updated INF position as a weighted mean sum using a possible distribution of final lens positions (I), a weight ($s_i$) being the weight of individual final lens positions, and the available lens positions (i); wherein initially the same default SOC and EOC values are set on a plurality of imaging devices; wherein the autofocus unit to update the lens position calibration data upon at least one of: when the imaging device is turned on, when autofocus algorithms are performed, and when autofocus algorithms are performed and an adjusted lens position resulting from the autofocus algorithms is used to capture a frame or still photograph.

The autofocus unit also may be provided to: use a histogram that counts the number of times individual lens positions have focus value changes between autofocus iterations; calculate a mean focus change over the count; and use the mean focus value changes to determine the updated SOC, EOC, or INF; wherein the focus value change is counted for both a previous lens position and a subsequent lens position associated with the focus value change; wherein the autofocus unit to form a histogram that counts the number of times a lens position is used as the best in-focus position to calculate the updated infinity position.

By one approach, at least one computer readable medium comprises a plurality of instructions that in response to being executed on a computing device, causes the computing device to: obtain lens position calibration data used to capture a plurality of frames of a video sequence or still photographs; calculate at least one of: an updated start of controllability (SOC), an updated end of controllability (EOC), updated infinity position (INF), and depending on, at least in part, the lens position calibration data of the plurality of frames or still photographs; and use at least one of the updated SOC, EOC, and INF to update a range of possible lens positions to capture a frame or photograph.

By another approach, the instructions cause the computing device to provide that the SOC or EOC is a lens position derived by using a set number of lens positions from either the start or end lens position of a range of physically possible lens positions provided by the imaging device, and wherein the set number of lens positions each being associated with a change in a focus value from autofocus iteration to iteration wherein the lens position is set at at least one of the iterations, wherein the change meets a condition, wherein the change in focus value is a change in sharpness between autofocus iterations wherein at least sharpness of the lens position is calculated, and wherein calculating the SOC or EOC comprises deriving the SOC or EOC by using a preset number of lens positions along a range of physically possible lens positions and each lens position of the set having a change in a focus value from autofocus iteration to iteration that meets a condition.

Also, the instructions cause the computing device to: calculate the updated INF position as a weighted mean sum using a possible distribution of final lens positions (I), a weight ($s_i$) being the weight of individual final lens positions, and the available lens positions (i); initially set the same default SOC and EOC values on a plurality of imaging devices; update the lens position calibration data upon at least one of: when the imaging device is turned on, when autofocus algorithms are performed, and when autofocus algorithms are performed and an adjusted lens position resulting from the autofocus algorithms is used to capture a frame or still photograph; use a histogram that counts the number of times individual lens positions have focus value changes between autofocus iterations; calculate a mean focus change over the count for individual lens positions; use the number of the lens position associated with selected mean focus value changes to determine the updated SOC, EOC, or INF, wherein the focus value change is counted for both a previous lens position and a subsequent lens position associated with the focus value change; and form a histogram that counts the number of times a lens position is used as the best in-focus final lens position to use to calculate the updated infinity position.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of automatic focus with self-calibration for an imaging device, comprising:
having the same initial default SOC and EOC values as set on a plurality of imaging devices;
obtaining lens position calibration data used to capture a plurality of frames of a video sequence or still photographs;
calculating at least one of:
an updated start of controllability (SOC),
an updated end of controllability (EOC),
updated infinity position (INF),
and depending, at least in part, on the lens position calibration data of the plurality of frames or still photographs; and
using at least one of the updated SOC, EOC, and INF to update a range of possible lens positions to capture a frame or photograph.

2. The method of claim 1 wherein the SOC or EOC is a lens position derived by using a set number of lens positions from either the start or end lens position of a range of physically possible lens positions provided by the imaging device.

3. The method of claim 2 wherein the set number of lens positions each being associated with a change in a focus value from autofocus iteration to iteration wherein the lens position is set at at least one of the iterations, and wherein the change meets a condition.

4. The method of claim 3 wherein the change in focus value is a change in sharpness between autofocus iterations wherein at least sharpness of the lens position is calculated.

5. The method of claim 1 wherein calculating the SOC or EOC comprises deriving the SOC or EOC by using a preset number of lens positions along a range of physically possible lens positions and each lens position of the set having a change in a focus value from autofocus iteration to iteration that meets a condition.

6. The method of claim 1 comprising calculating the updated INF position as a weighted mean sum using a possible distribution of final lens positions (I), a weight ($s_i$) being the weight of individual final lens positions, and the available lens positions (i).

7. The method of claim 1 comprising updating the lens position calibration data upon at least one of:
when the imaging device is turned on,
when autofocus algorithms are performed, and
when autofocus algorithms are performed and an adjusted lens position resulting from the autofocus algorithms is used to capture a frame or still photograph.

8. The method of claim 1 comprising:
using a histogram that counts the number of times individual lens positions have focus value changes between autofocus iterations;
calculating a mean focus change over the count for individual lens positions; and
using the number of the lens position associated with selected mean focus value changes to determine the updated SOC, EOC, or INF.

9. The method of claim 8 wherein the focus value change is counted for both a previous lens position and a subsequent lens position associated with the focus value change.

10. The method of claim 8 comprising forming a histogram that counts the number of times a lens position is used as the best in-focus final lens position to use to calculate the updated infinity position.

11. The method of claim 1 wherein the SOC or EOC is a lens position derived by using a set number of lens positions from either the start or end lens position of a range of physically possible lens positions provided by the imaging device,
wherein the set number of lens positions each being associated with a change in a focus value from autofocus iteration to iteration wherein the lens position is set at at least one of the iterations, and wherein the change meets a condition, wherein the change in focus value is a change in sharpness between autofocus iterations wherein at least sharpness of the lens position is calculated;
wherein calculating the SOC or EOC comprises deriving the SOC or EOC by using a preset number of lens positions along a range of physically possible lens positions and each lens position of the set having a change in a focus value from autofocus iteration to iteration that meets a condition;
the method comprising:

calculating the updated INF position as a weighted mean sum using a possible distribution of final lens positions (I), a weight ($s_i$) being the weight of individual final lens positions, and the available lens positions (i);

updating the lens position calibration data upon at least one of:
when the imaging device is turned on,
when autofocus algorithms are performed, and
when autofocus algorithms are performed and an adjusted lens position resulting from the autofocus algorithms is used to capture a frame or still photograph;

using a histogram that counts the number of times individual lens positions have focus value changes between autofocus iterations;

calculating a mean focus change over the count for individual lens positions;

using the number of the lens position associated with selected mean focus value changes to determine the updated SOC, EOC, or INF, wherein the focus value change is counted for both a previous lens position and a subsequent lens position associated with the focus value change; and forming a histogram that counts the number of times a lens position is used as the best in-focus final lens position to use to calculate the updated infinity position.

12. A computer-implemented system of autofocus with self-calibration comprising:
a display;
at least one processor communicatively coupled to the display;
at least one memory communicatively coupled to at least one processor and storing lens position calibration data used to capture a plurality of frames of a video sequence or a plurality of still photographs; and
an autofocus (AF) self-calibration unit communicatively coupled to the processor, and to:
obtain lens position calibration data used to capture a plurality of frames of a video sequence or still photographs;
calculate at least one of:
an updated start of controllability (SOC),
an updated end of controllability (EOC),
updated infinity position (INF),
and depending on, at least in part, the lens position calibration data of the plurality of frames or still photographs; and
use at least one of the updated SOC, EOC, and INF to update a range of possible lens positions to capture a frame or photograph;
wherein the autofocus unit calculates the updated INF position as a weighted mean sum using a possible distribution of final lens positions (I), a weight ($s_i$) being the weight of individual final lens positions, and the available lens positions (i).

13. The system of claim 12 wherein the SOC or EOC is a lens position derived by using a set number of lens positions from either the start or end lens position of a range of physically possible lens positions provided by the imaging device.

14. The system of claim 13 wherein the set number of lens positions each being associated with a change in a focus value from autofocus iteration to iteration wherein the lens position is set at at least one of the iterations, and wherein the change meets a condition.

15. The system of claim 14 wherein the change in focus value is a change in sharpness between autofocus iterations wherein at least sharpness of the lens position is calculated.

16. The system of claim 12 wherein calculating the SOC or EOC comprises deriving the SOC or EOC by using a preset number of lens positions along a range of physically possible lens positions and each lens position of the set having a change in a focus value from autofocus iteration to iteration that meets a condition.

17. The system of claim 12 wherein the autofocus unit to update the lens position calibration data upon at least one of:
when the imaging device is turned on,
when autofocus algorithms are performed, and
when autofocus algorithms are performed and an adjusted lens position resulting from the autofocus algorithms is used to capture a frame or still photograph.

18. The system of claim 12 wherein the autofocus unit to:
use a histogram that counts the number of times individual lens positions have focus value changes between autofocus iterations;
calculate a mean focus change over the count; and
use the mean focus value changes to determine the updated SOC, EOC, or INF.

19. The system of claim 12 wherein the SOC or EOC is a lens position derived by using a set number of lens positions from either the start or end lens position of a range of physically possible lens positions provided by the imaging device,
wherein the set number of lens positions each being associated with a change in a focus value from autofocus iteration to iteration wherein the lens position is set at at least one of the iterations, and wherein the change meets a condition;
wherein the change in focus value is a change in sharpness between autofocus iterations wherein at least sharpness of the lens position is calculated;
wherein calculating the SOC or EOC comprises deriving the SOC or EOC by using a preset number of lens positions along a range of physically possible lens positions and each lens position of the set having a change in a focus value from autofocus iteration to iteration that meets a condition;
the autofocus (AF) self-calibration unit initially having the same default SOC and EOC values as those set on a plurality of imaging devices;
wherein the autofocus unit to update the lens position calibration data upon at least one of:
when the imaging device is turned on,
when autofocus algorithms are performed, and
when autofocus algorithms are performed and an adjusted lens position resulting from the autofocus algorithms is used to capture a frame or still photograph;
wherein the autofocus unit to:
use a histogram that counts the number of times individual lens positions have focus value changes between autofocus iterations;
calculate a mean focus change over the count; and
use the mean focus value changes to determine the updated SOC, EOC, or INF;
wherein the focus value change is counted for both a previous lens position and a subsequent lens position associated with the focus value change;
wherein the autofocus unit to form a histogram that counts the number of times a lens position is used as the best in-focus position to calculate the updated infinity position.

20. At least one non-transitory computer readable medium comprising a plurality of instructions that in response to being executed on a computing device, causes the computing device to:

obtain lens position calibration data used to capture a plurality of frames of a video sequence or still photographs;

calculate at least one of:
an updated start of controllability (SOC),
an updated end of controllability (EOC),
updated infinity position (INF),
comprising use a histogram that counts the number of times individual lens positions have focus value changes between autofocus iterations;
calculate a mean focus change over the count; and
use the mean focus value changes to determine the updated SOC, EOC, or INF;
and depending on, at least in part, the lens position calibration data of the plurality of frames or still photographs; and
use at least one of the updated SOC, EOC, and INF to update a range of possible lens positions to capture a frame or photograph.

21. The medium of claim 20 wherein the focus value change is counted for both a previous lens position and a subsequent lens position associated with the focus value change.

22. The medium of claim 20 wherein the instructions cause the computing device to form a histogram that counts the number of times a lens position is used as the best in-focus position to calculate the updated infinity position.

23. The article of claim 20, wherein the SOC or EOC is a lens position derived by using a set number of lens positions from either the start or end lens position of a range of physically possible lens positions provided by the imaging device, wherein the set number of lens positions each being associated with a change in a focus value from autofocus iteration to iteration wherein the lens position is set at at least one of the iterations, and wherein the change meets a condition, wherein the change in focus value is a change in sharpness between autofocus iterations wherein at least sharpness of the lens position is calculated;

wherein calculating the SOC or EOC comprises deriving the SOC or EOC by using a preset number of lens positions along a range of physically possible lens positions and each lens position of the set having a change in a focus value from autofocus iteration to iteration that meets a condition;

the instructions causing the computing device to:

calculate the updated INF position as a weighted mean sum using a possible distribution of final lens positions (I), a weight ($s_i$) being the weight of individual final lens positions, and the available lens positions (i);

initially have the same default SOC and EOC values as those set on a plurality of imaging devices;

update the lens position calibration data upon at least one of:
when the imaging device is turned on,
when autofocus algorithms are performed, and
when autofocus algorithms are performed and an adjusted lens position resulting from the autofocus algorithms is used to capture a frame or still photograph;

wherein the focus value change is counted for both a previous lens position and a subsequent lens position associated with the focus value change; and form a histogram that counts the number of times a lens position is used as the best in-focus final lens position to use to calculate the updated infinity position.

* * * * *